(12) United States Patent
Reber

(10) Patent No.: US 8,373,980 B2
(45) Date of Patent: Feb. 12, 2013

(54) SYSTEM FOR MOUNTING A DISPLAY TO A COMPUTER

(75) Inventor: David Reber, Cedar Park, TX (US)

(73) Assignee: Explore Technologies Corp., Austin, TX (US)

( * ) Notice: Subject to any disclaimer, the term of this patent is extended or adjusted under 35 U.S.C. 154(b) by 167 days.

(21) Appl. No.: 13/039,054

(22) Filed: Mar. 2, 2011

(65) Prior Publication Data

US 2012/0099261 A1  Apr. 26, 2012

Related U.S. Application Data

(63) Continuation of application No. 12/969,191, filed on Dec. 15, 2010, and a continuation of application No. 12/969,172, filed on Dec. 15, 2010, and a continuation of application No. 12/969,159, filed on Dec. 15, 2010.

(60) Provisional application No. 61/405,926, filed on Oct. 22, 2010.

(51) Int. Cl.
*G06F 1/16* (2006.01)
(52) U.S. Cl. .............................. 361/679.3; 361/679.55
(58) Field of Classification Search ................. 361/679.3
See application file for complete search history.

(56) References Cited

U.S. PATENT DOCUMENTS

| | | | |
|---|---|---|---|
| 5,276,317 A | 1/1994 | Ozouf et al. |
| 5,373,458 A | 12/1994 | Bishay et al. |
| 5,419,626 A | 5/1995 | Crockett |
| 5,448,741 A | 9/1995 | Oka |
| 5,455,746 A | 10/1995 | Sato et al. |
| 5,479,285 A | 12/1995 | Burke |
| 5,539,193 A | 7/1996 | Gibbs et al. |
| 5,552,967 A | 9/1996 | Seto et al. |
| 5,554,822 A | 9/1996 | Gilpin et al. |
| 5,606,438 A | 2/1997 | Margalit et al. |
| 5,661,634 A | 8/1997 | Obata et al. |
| 5,815,225 A | 9/1998 | Nelson |
| 5,822,547 A | 10/1998 | Boesch et al. |
| 5,910,883 A | 6/1999 | Cipolla et al. |
| 5,946,187 A | 8/1999 | Cipolla |
| 5,987,547 A | 11/1999 | Panasik et al. |
| 6,047,342 A | 4/2000 | Depew |
| 6,047,373 A | 4/2000 | Hall et al. |
| 6,061,231 A | 5/2000 | Crockett |
| 6,076,161 A | 6/2000 | Ho |

(Continued)

FOREIGN PATENT DOCUMENTS

| | | |
|---|---|---|
| EP | 0349210 A2 | 1/1990 |
| EP | 0656600 A2 | 6/1995 |

(Continued)

OTHER PUBLICATIONS

PCT International Search Report and Written Opinion for PCT International Patent Application No. PCT/US2011/056830, mailed May 11, 2012.

(Continued)

*Primary Examiner* — Lisa Lea Edmonds
(74) *Attorney, Agent, or Firm* — Pillsbury Winthrop Shaw Pittman LLP

(57) ABSTRACT

A computer includes various features that improve its functionality and/or ease of use. A modular electronics cartridge that includes a piston seal and opposed-direction latches removably engages a cartridge bay of the computer. A high intensity touch-screen display and a high power processor are disposed in a sealed compartment of the computer, and a remote heat exchanger is used to cool the sealed compartment. An interface converter/adapter converts a standard mini-PCI Express slot into a specialized mini-PCI Express slot with voice capabilities. SIM and microSD card slots mount to a pivoting door on the computer such that opening the door provides easier access to the card slots.

15 Claims, 25 Drawing Sheets

U.S. PATENT DOCUMENTS

| | | | |
|---|---|---|---|
| 6,099,355 | A | 8/2000 | Johnson et al. |
| 6,134,613 | A | 10/2000 | Stephenson et al. |
| 6,208,509 | B1 | 3/2001 | Cha |
| 6,212,066 | B1 | 4/2001 | Fetterman |
| 6,226,180 | B1 | 5/2001 | Ueda et al. |
| 6,327,653 | B1 | 12/2001 | Lee |
| 6,333,847 | B1 | 12/2001 | Katsui et al. |
| 6,381,124 | B1 * | 4/2002 | Whitcher et al. ......... 361/679.3 |
| 6,385,042 | B1 | 5/2002 | Chen |
| 6,385,043 | B1 | 5/2002 | Ueda et al. |
| 6,411,502 | B1 * | 6/2002 | Burrell ................ 361/679.3 |
| 6,469,892 | B2 | 10/2002 | Ueda et al. |
| 6,480,964 | B1 | 11/2002 | Oh |
| 6,504,713 | B1 | 1/2003 | Pandolfi et al. |
| 6,507,493 | B2 | 1/2003 | Ueda et al. |
| 6,507,906 | B1 | 1/2003 | Criddle et al. |
| 6,532,152 | B1 | 3/2003 | White et al. |
| 6,538,606 | B2 | 3/2003 | Quinn et al. |
| 6,549,399 | B2 | 4/2003 | Jenks |
| 6,587,336 | B2 | 7/2003 | Chu et al. |
| 6,611,425 | B2 | 8/2003 | Ohashi et al. |
| 6,646,864 | B2 | 11/2003 | Richardson |
| 6,657,867 | B2 | 12/2003 | Smith |
| 6,661,650 | B2 | 12/2003 | Nakajima et al. |
| 6,717,808 | B2 | 4/2004 | Ueda et al. |
| 6,721,651 | B1 | 4/2004 | Minelli |
| 6,741,464 | B2 | 5/2004 | Kitano et al. |
| 6,771,492 | B2 | 8/2004 | DeLuga et al. |
| 6,771,498 | B2 | 8/2004 | Wang et al. |
| 6,791,825 | B1 * | 9/2004 | Taylor ................ 361/679.6 |
| 6,795,312 | B2 | 9/2004 | Narakino et al. |
| 6,809,927 | B2 | 10/2004 | Ohashi et al. |
| 6,826,628 | B2 | 11/2004 | Huang |
| 6,826,638 | B1 | 11/2004 | Jaggers et al. |
| 6,845,011 | B2 | 1/2005 | Tomioka et al. |
| 6,871,138 | B1 | 3/2005 | Minelli |
| 6,873,525 | B2 | 3/2005 | Minamitani et al. |
| 6,900,795 | B1 | 5/2005 | Knight, III et al. |
| 6,900,984 | B2 | 5/2005 | Merz et al. |
| 6,914,773 | B2 | 7/2005 | Yang et al. |
| 6,927,761 | B2 | 8/2005 | Badaye et al. |
| 6,938,175 | B2 | 8/2005 | Lee |
| 6,947,282 | B2 | 9/2005 | Hotta et al. |
| 6,950,303 | B2 | 9/2005 | Neho et al. |
| 6,983,130 | B2 | 1/2006 | Chien et al. |
| 6,987,668 | B2 | 1/2006 | Kitano et al. |
| 7,042,724 | B2 | 5/2006 | Löcker |
| 7,098,899 | B1 | 8/2006 | Ginosaur |
| 7,145,766 | B2 | 12/2006 | Homer et al. |
| 7,174,407 | B2 | 2/2007 | Hou et al. |
| 7,182,646 | B1 | 2/2007 | Chou et al. |
| 7,187,540 | B2 | 3/2007 | Homer et al. |
| 7,203,070 | B2 | 4/2007 | Weisz-Margulescu et al. |
| 7,209,355 | B2 | 4/2007 | Koga et al. |
| 7,212,403 | B2 | 5/2007 | Rockenfeller |
| 7,213,139 | B2 | 5/2007 | Zhang |
| 7,228,408 | B2 | 6/2007 | Wu et al. |
| 7,234,054 | B2 | 6/2007 | Rothman et al. |
| 7,234,055 | B2 | 6/2007 | Chiu et al. |
| 7,254,664 | B2 | 8/2007 | Hsieh |
| 7,257,704 | B2 | 8/2007 | O'Neal |
| 7,264,512 | B2 | 9/2007 | Wolford et al. |
| 7,357,643 | B1 | 4/2008 | Chen et al. |
| 7,362,589 | B2 | 4/2008 | Gay |
| 7,376,776 | B2 | 5/2008 | Shen |
| 7,403,398 | B2 | 7/2008 | Hsu |
| 7,418,344 | B2 | 8/2008 | Holtzman et al. |
| 7,434,171 | B2 | 10/2008 | Clapper |
| 7,440,293 | B2 | 10/2008 | Hood, III et al. |
| 7,443,696 | B2 | 10/2008 | Lin et al. |
| 7,453,689 | B2 | 11/2008 | Kim et al. |
| 7,457,113 | B2 | 11/2008 | Kumhyr et al. |
| 7,506,152 | B2 | 3/2009 | Park et al. |
| 7,506,208 | B2 | 3/2009 | Bang |
| 7,519,350 | B2 | 4/2009 | Yamamoto et al. |
| 7,522,889 | B2 | 4/2009 | Wulff et al. |
| 7,612,779 | B2 | 11/2009 | Spektor et al. |
| 7,627,344 | B2 | 12/2009 | Ying |
| 7,643,284 | B2 | 1/2010 | Nakamura |
| 7,656,665 | B2 | 2/2010 | Lin et al. |
| 7,657,734 | B2 | 2/2010 | Vesterinen et al. |
| 7,660,979 | B2 | 2/2010 | Tseng |
| 7,663,879 | B2 * | 2/2010 | Richardson et al. ..... 361/679.56 |
| 7,685,363 | B2 | 3/2010 | Lin et al. |
| 7,707,400 | B2 | 4/2010 | Soin et al. |
| 7,725,705 | B2 | 5/2010 | Huang |
| 7,733,276 | B2 | 6/2010 | Levy et al. |
| 7,733,642 | B2 | 6/2010 | Liou et al. |
| 7,791,876 | B2 | 9/2010 | Moore et al. |
| 7,821,782 | B2 | 10/2010 | Doherty et al. |
| 7,907,394 | B2 * | 3/2011 | Richardson et al. ....... 361/679.3 |
| 7,933,122 | B2 * | 4/2011 | Richardson et al. ..... 361/679.55 |
| 2001/0015885 | A1 | 8/2001 | Nakajima et al. |
| 2002/0085343 | A1 | 7/2002 | Wu et al. |
| 2003/0007325 | A1 | 1/2003 | Thunem et al. |
| 2003/0235042 | A1 | 12/2003 | Harris et al. |
| 2004/0004680 | A1 | 1/2004 | Kim |
| 2004/0037035 | A1 | 2/2004 | Ohashi et al. |
| 2004/0068592 | A1 | 4/2004 | Higashitani et al. |
| 2004/0251872 | A1 | 12/2004 | Wang et al. |
| 2005/0078450 | A1 | 4/2005 | Ohashi et al. |
| 2005/0086415 | A1 | 4/2005 | Huang |
| 2006/0023406 | A1 | 2/2006 | Shih et al. |
| 2006/0259758 | A1 | 11/2006 | Deng et al. |
| 2007/0011384 | A1 | 1/2007 | Zhang |
| 2007/0021079 | A1 | 1/2007 | Lin |
| 2007/0041157 | A1 | 2/2007 | Wang |
| 2007/0218846 | A1 | 9/2007 | Neill et al. |
| 2007/0279859 | A1 * | 12/2007 | Canova et al. ............. 361/683 |
| 2008/0013268 | A1 | 1/2008 | Wong et al. |
| 2008/0055258 | A1 | 3/2008 | Sauers |
| 2008/0065805 | A1 | 3/2008 | Wu et al. |
| 2008/0080128 | A1 | 4/2008 | Chikazawa et al. |
| 2008/0106476 | A1 | 5/2008 | Tran et al. |
| 2008/0126282 | A1 | 5/2008 | Sinclair et al. |
| 2008/0184047 | A1 | 7/2008 | Goeltzenleuchter |
| 2008/0298450 | A1 | 12/2008 | Zhang et al. |
| 2009/0046024 | A1 | 2/2009 | Hsu |
| 2009/0066903 | A1 | 3/2009 | Yoshida et al. |
| 2009/0073654 | A1 | 3/2009 | Beam et al. |
| 2009/0103257 | A1 | 4/2009 | Maeda et al. |
| 2009/0186647 | A1 | 7/2009 | Smart et al. |
| 2009/0203283 | A1 | 8/2009 | Gentile |
| 2009/0207569 | A1 | 8/2009 | Tsunoda et al. |
| 2009/0213092 | A1 | 8/2009 | Kuo et al. |
| 2009/0219259 | A1 | 9/2009 | Kwon |
| 2009/0284424 | A1 | 11/2009 | Yoon et al. |
| 2010/0026589 | A1 | 2/2010 | Dou et al. |
| 2010/0033629 | A1 | 2/2010 | Utz et al. |
| 2010/0073242 | A1 | 3/2010 | Ayala Vazquez et al. |
| 2010/0079350 | A1 | 4/2010 | Lai et al. |
| 2010/0079940 | A1 | 4/2010 | Mongia et al. |
| 2010/0091454 | A1 | 4/2010 | Degner et al. |
| 2010/0115303 | A1 | 5/2010 | Stedman et al. |
| 2010/0156741 | A1 | 6/2010 | Vazquez et al. |
| 2010/0169559 | A1 | 7/2010 | Harari et al. |
| 2010/0169561 | A1 | 7/2010 | Harari et al. |

FOREIGN PATENT DOCUMENTS

| | | | |
|---|---|---|---|
| EP | 0843273 | A2 | 5/1998 |
| EP | 1217598 | A2 | 6/2002 |
| GB | 2190529 | | 11/1987 |
| WO | 2008/091677 | | 7/2008 |

OTHER PUBLICATIONS

AirPort Extreme Card Replacement Instructions, Jan. 1, 2003, obtained from url: <http://manuals.info.apple.com/en_US/pbg4-12in-apc.pdf>.

* cited by examiner

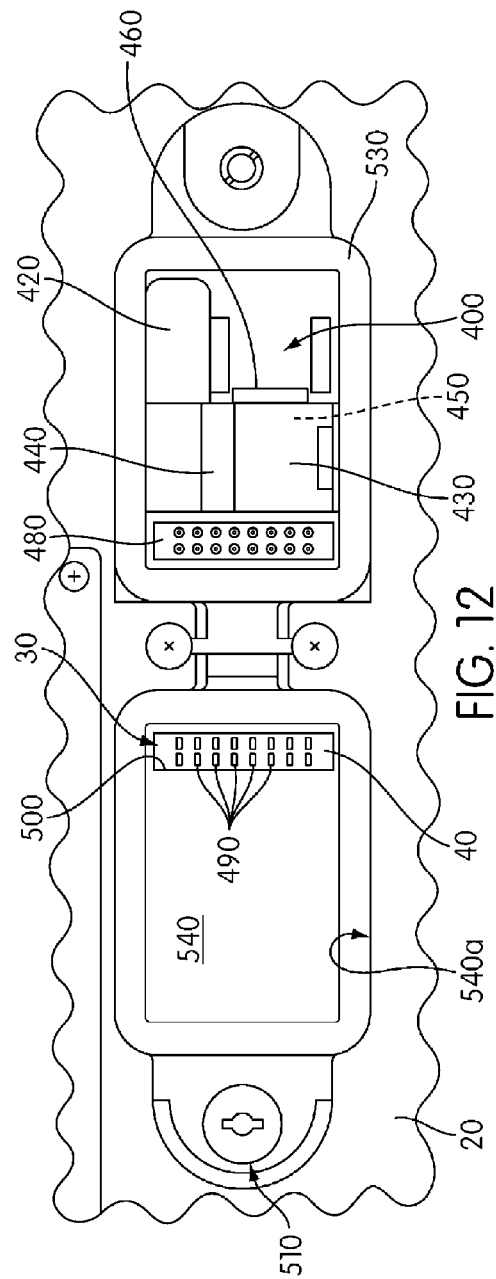
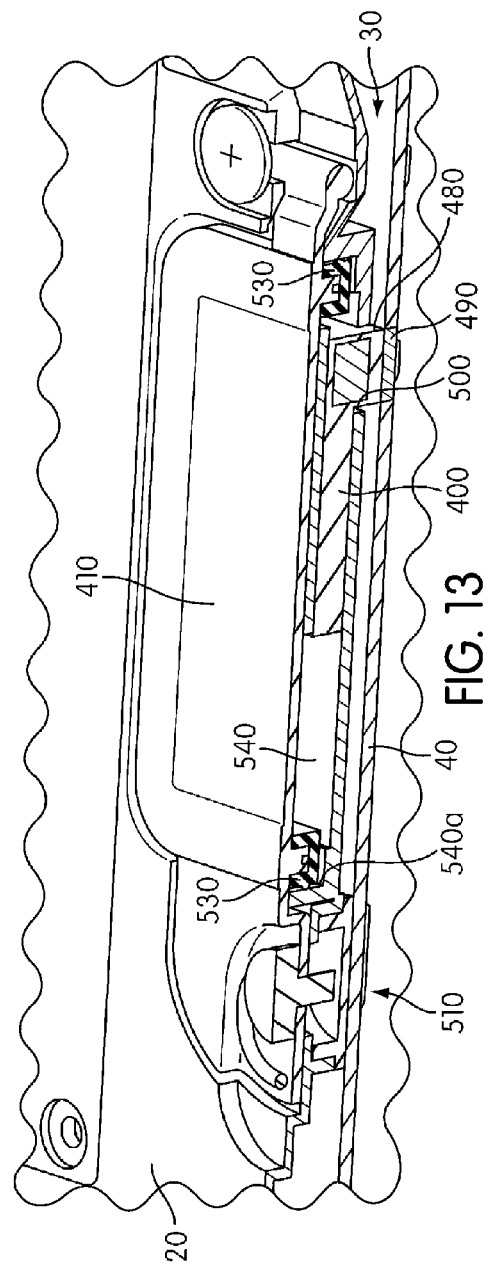

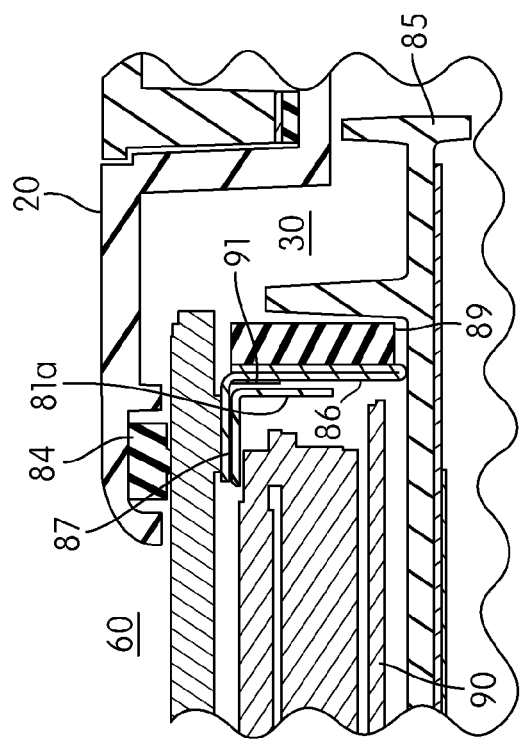
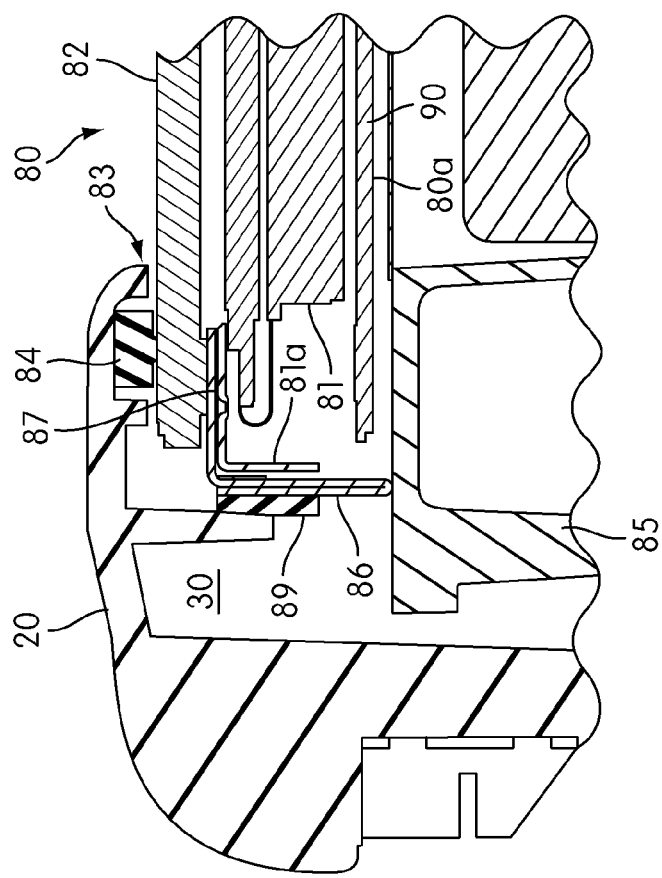
FIG. 26

SYSTEM FOR MOUNTING A DISPLAY TO A COMPUTER

CROSS REFERENCE

This application claims the benefit of priority from U.S. Provisional Patent Application No. 61/405,926, filed Oct. 22, 2010, titled "COMPUTER," and is a continuation application of U.S. application Ser. No. 12/969,191, filed Dec. 15, 2010, titled "Computer With Removable Cartridge," U.S. application Ser. No. 12/969,159, filed Dec. 15, 2010, titled "Computer With Door-Mounted Electronics," and U.S. application Ser. No. 12/969,172, filed Dec. 15, 2010, titled "Computer With High Intensity Screen," the entire contents of each of which are hereby incorporated by reference herein.

BACKGROUND OF THE INVENTION

1. Field of the Invention

One or more embodiments of the present invention relate generally to portable computers.

2. Description of Related Art

Portable computers such as laptops and tablet PCs are used in a wide variety of environments. Ruggedized laptops and tablet PCs include sealed compartments to house the computer's components so as to discourage foreign debris/moisture from entering the compartments and damaging the computer. Ruggedized laptops and tablets may also include various features that protect the computer from damage caused by rough handling, drops, and other impacts. Xplore Technologies Corporation's iX104C4 tablet PC is an example of such a ruggedized computer.

SUMMARY OF EMBODIMENTS OF THE INVENTION

One or more embodiments of the present invention provide increased functionality and/or ease of use to computers such as laptops and tablet PCS, including ruggedized versions of such computers.

One or more of these embodiments provides a tablet computer including a case defining a sealed compartment, a touch-screen display supported by the case, the display facing outward away from the case, the display further comprising a screen and a touch panel, disposed outwardly of the screen and being transparent to allow viewing of the screen therethrough, through an opening in the case, a sealing member, disposed between the touch panel and the opening in the case in a water tight sealing relation, and a frame, disposed about a perimeter of the touch panel and configured and arranged to transfer a compressive force generated between the sealing member and the touch panel to a chassis disposed in the case, substantially without transmitting the compressive force to the screen.

These and other aspects of various embodiments of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment of the invention, the structural components illustrated herein are drawn to scale. It is to be expressly understood, however, that the drawings are for the purpose of illustration and description only and are not intended as a definition of the limits of the invention. In addition, it should be appreciated that structural features shown or described in any one embodiment herein can be used in other embodiments as well. As used in the specification and in the claims, the singular form of "a", "an", and "the" include plural forms unless the context clearly dictates otherwise.

BRIEF DESCRIPTION OF THE DRAWINGS

For a better understanding of embodiments of the present invention as well as other objects and further features thereof, reference is made to the following description which is to be used in conjunction with the accompanying drawings, where:

FIG. 12 is a partial rear view of the computer of FIG. 1 showing an electronics interface door in an open position;

FIG. 13 is a partial cross-sectional view of the computer of FIG. 1 showing the electronics interface door in a closed position;

FIG. 26 is a partial cross-sectional view of the computer of FIG. 1, taken along the line 26-26 in FIG. 1;

DETAILED DESCRIPTION OF EXEMPLARY EMBODIMENTS OF THE INVENTION

FIGS. 1-22 illustrate a tablet PC 10 according to an embodiment of the invention. Although the illustrated computer 10 comprises a tablet PC, a variety of different types of computers may alternatively be used according to various embodiments of the present invention (e.g., a portable laptop PC with a display that pivots (or otherwise moves) open and closed relative to the PC's case; a desktop PC with a case that is physically separate from the display; a handheld computer such as a smartphone, PDA, etc.).

Figure 4:
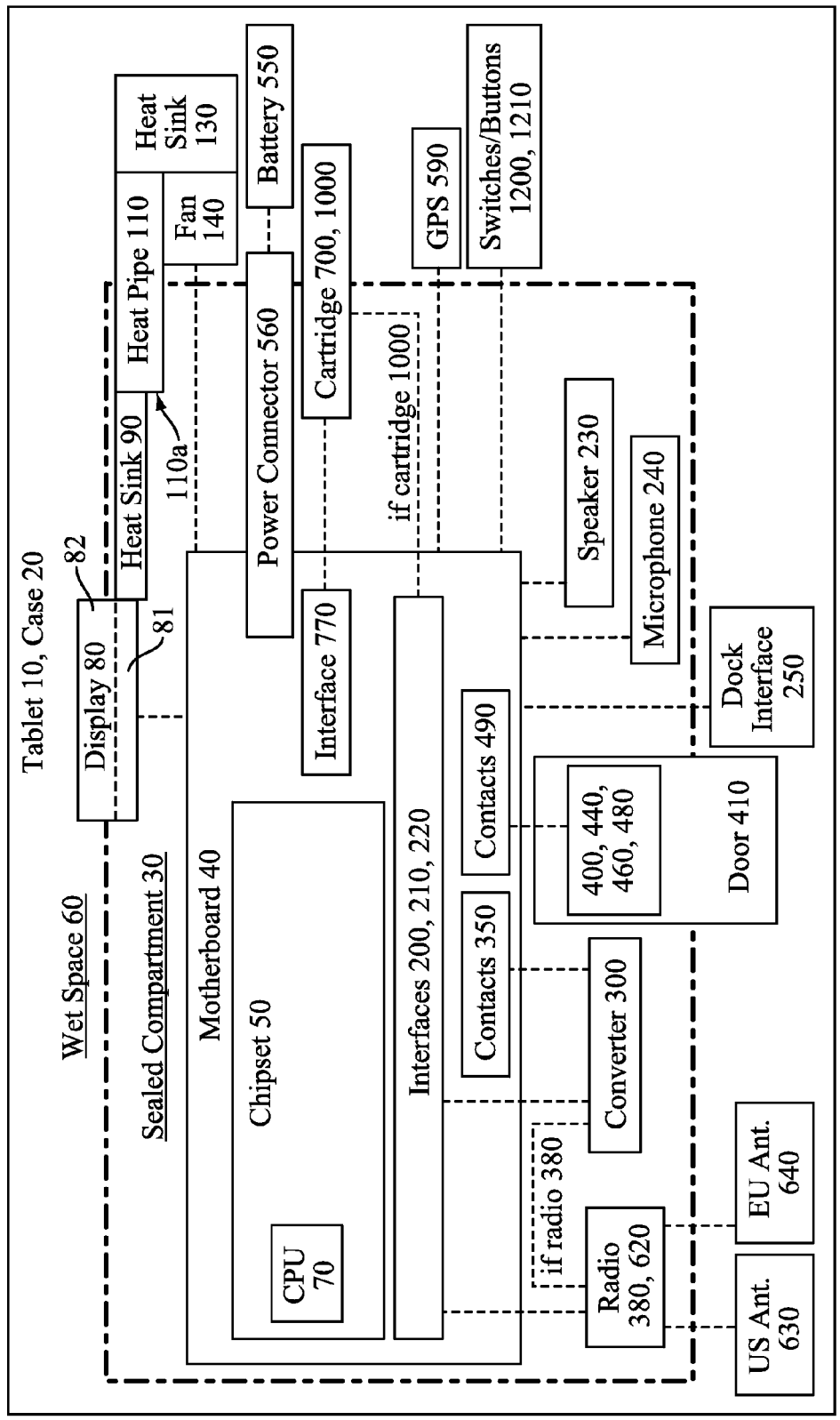
FIG. 4 is a block diagram of the computer of FIG. 1.

As shown in FIG. 4 and separately discussed in greater detail below, the tablet 10 comprises, among other things, a case 20, a motherboard 40, a chipset 50, a display 80, a remote heat exchanger 100, a plurality of electronics interfaces 200, 210, 220, 400, a docking connector 250, a battery 550, an electronics access door 410, a GPS 590. one or more radios 380, 620 that utilize antennas 630, 640, a cartridge bay 800 that accepts a variety of modular, modular electronics-containing cartridges 700, 1000, and power and function switches 1200, 1210.

The case 20 provides a structural frame for the tablet 20. In the illustrated embodiment, the case 20 is defined by a plurality of separate components that connect to each other. The case 20 may alternatively be defined by greater or fewer structures without deviating from the scope of the present invention. The case 20 may comprise materials that are light, strong, impact resistant, abrasion-resistant, scratch-resistant, shock-absorbing, and/or water-tight (e.g., aluminum, titanium, magnesium, plastic, rubber, elastomeric materials, etc.). According to one embodiment, the main upper and lower structural portions of the case 20 and the door 410 comprise magnesium, while a holed cover 180 for the fan 140 comprises plastic.

As shown in FIG. 4, the case 20, either alone or in combination with other components (e.g., the display 80, the door 410, cartridge 700, 1000), creates a water-tight, sealed compartment 30 (also known as a "dry" compartment). As shown in FIG. 4, the sealed compartment 30 contains a variety of the tablet components, including, among others, the motherboard 40, chipset 50, interfaces 200, 210, 220, 400, 770, electric contacts 350, 480, 490, an interface converter 300, radio(s) 380, 620, SIM and memory cards 440, 460, a speaker 230, and a microphone 240.

The case 20 likewise defines a "wet" space 60 that is disposed outside of the "dry" compartment 30 and is exposed to the ambient environment outside of the sealed compartment 30. The wet space 60 includes space within the case 20, but outside of the sealed compartment 30, and space outside of the case 20. Tablet 10 components such as a fan 140, heat sink 130, docking interface 250, power connector 560, battery 550, GPS 590, switches/buttons 1200, 1210, and antennas 630, 640 are disposed at least partially in the wet space 60.

Some components of the tablet 10 are partially disposed in the sealed compartment 30 and partially disposed in the wet area 60, including, for example, the display 80, the heat pipe 110, the power connector 560, and the door 410. For such dual-space components, a suitable sealing structure (e.g., a gasket, silicone sealant) is used to seal the portion of the component in the sealed compartment 30 from the portion of the component in the wet space 60.

Although particular components are illustrated as being in particular spaces 30, 60, any one or more components of the tablet 10 may be disposed in a different space 30, 60, depending on the environment in which the tablet 10 is to be used, the ruggedness of the component, and/or other design consideration(s) without deviating from the scope of the present invention. For example, the speaker 230 and microphone 240 may be disposed in the wet space 60.

As used herein, the phrase "water-tight" in reference to a connection or seal means that the connection will prevent water leakage therethrough when the connection is submerged in water. According to various embodiments, the entire sealed compartment 30 (including all water-tight connections/seals that separate the compartment 30 from the wet space 60) is water-tight to a water depth of at least 1 meter.

The motherboard 40 is supported by the case 20. According to various embodiments, the motherboard 40 comprises a printed circuit board (PCB), a plurality of PCBs, or another structure suitable for use in electrically interconnecting circuits, chips 50, 70, interfaces 200, 210, 220, 770, the display 80, components, cards 440, 460, devices 380, 620, a battery 550, the cartridge(s) 700, 1000, etc. to each other. However, various components of the tablet 10 may alternatively directly connect to each other without the use of an intermediary motherboard 40, according to various embodiments of the present invention.

The chipset 50 electrically connects to the motherboard 40. The chipset 50 comprises one or more chips for providing functionality to the tablet 10 (e.g., for communicating with electronics components of the tablet, for running an operating system of the tablet 10 (e.g., Microsoft Windows, Linux, etc.), for running executable programs/code stored on a storage device of the tablet 10, for running the display 80 and screen 81 thereof, for running the user interface (e.g., the touch panel 82) of the tablet 10, for interconnecting tablet components). The chipset 50 includes a variety of chips and circuits, including, among others, a central processing unit (CPU) 70 (see FIG. 22), a platform controller hub (PCH) 75 (see FIG. 22), a graphics processing unit (GPU), interface-specific chips/controllers, and memory (e.g., random access memory). However, the chipset 50 may additionally and/or alternatively comprise other chips/circuits without deviating from the scope of the present invention.

The processor 70 may comprise any suitable processor (e.g., Intel® Core™ i7 processor, other Intel® Core™ i processors, Intel dual core processors, Intel Atom processors, AMD processors, ARM based processors, etc.) or combination of processors (e.g., a dual processor, quad processor, etc.) for carrying out various functions of the tablet 10 (e.g., running the operating system and programs/executable code). According to various embodiments, the processor 70 generates at least 8, 9, 10, 11, 12, 13, 14, or 15 watts of heat during use.

Figure 1:
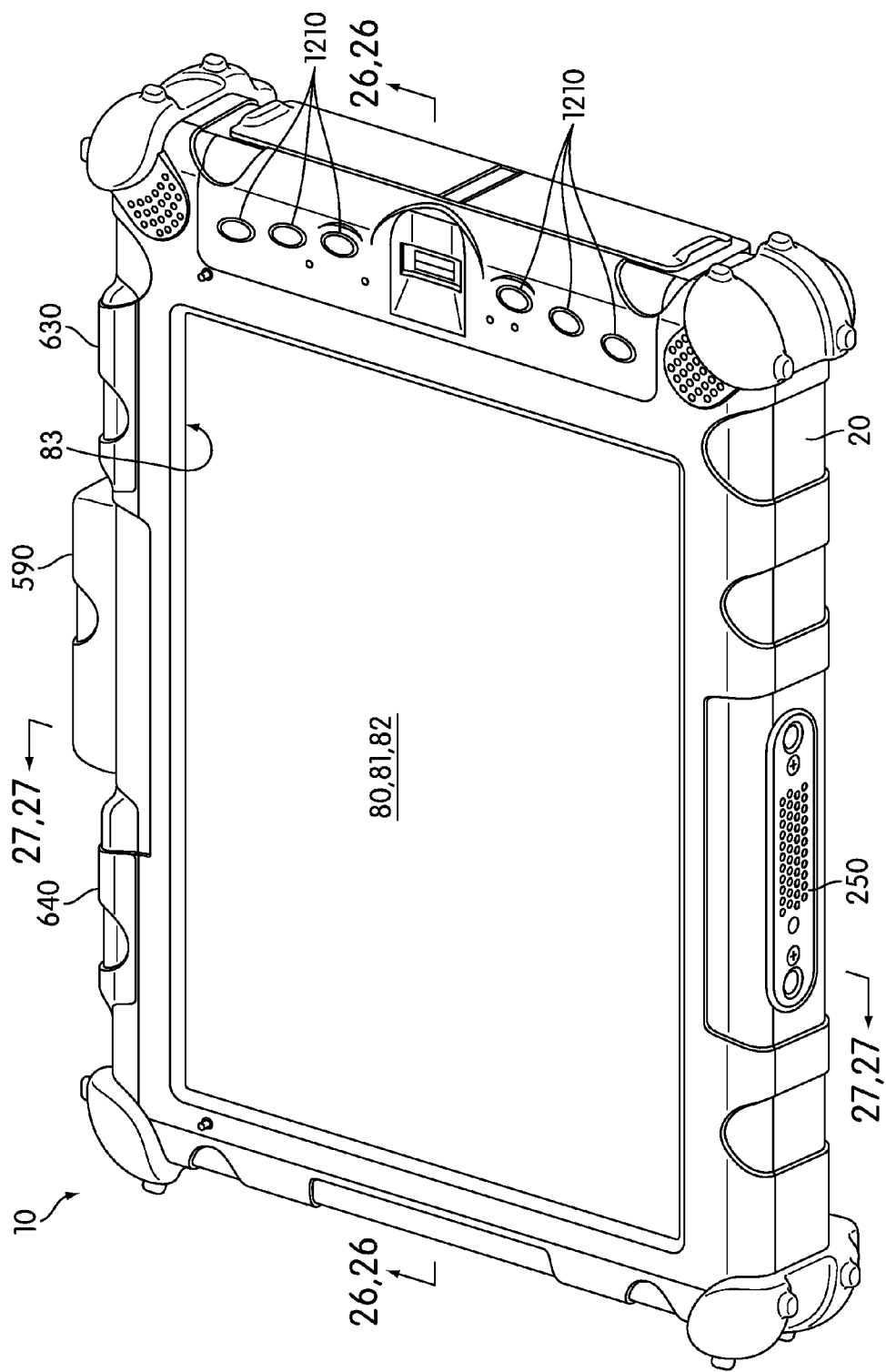
FIG. 1 is a front perspective view of a computer according to an embodiment of the invention.
Figure 27:
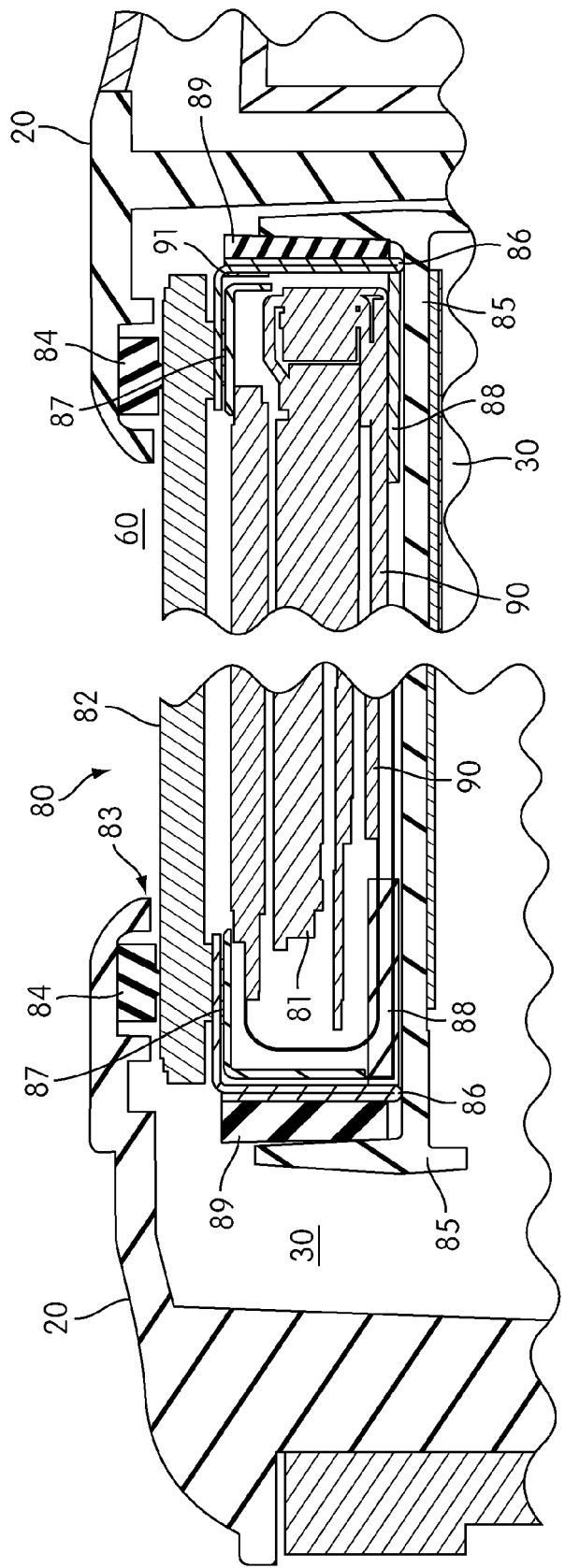
FIG. 27 is a partial cross-sectional view of the computer of FIG. 1, taken along the line 27-27 in FIG. 1.
Figure 28:
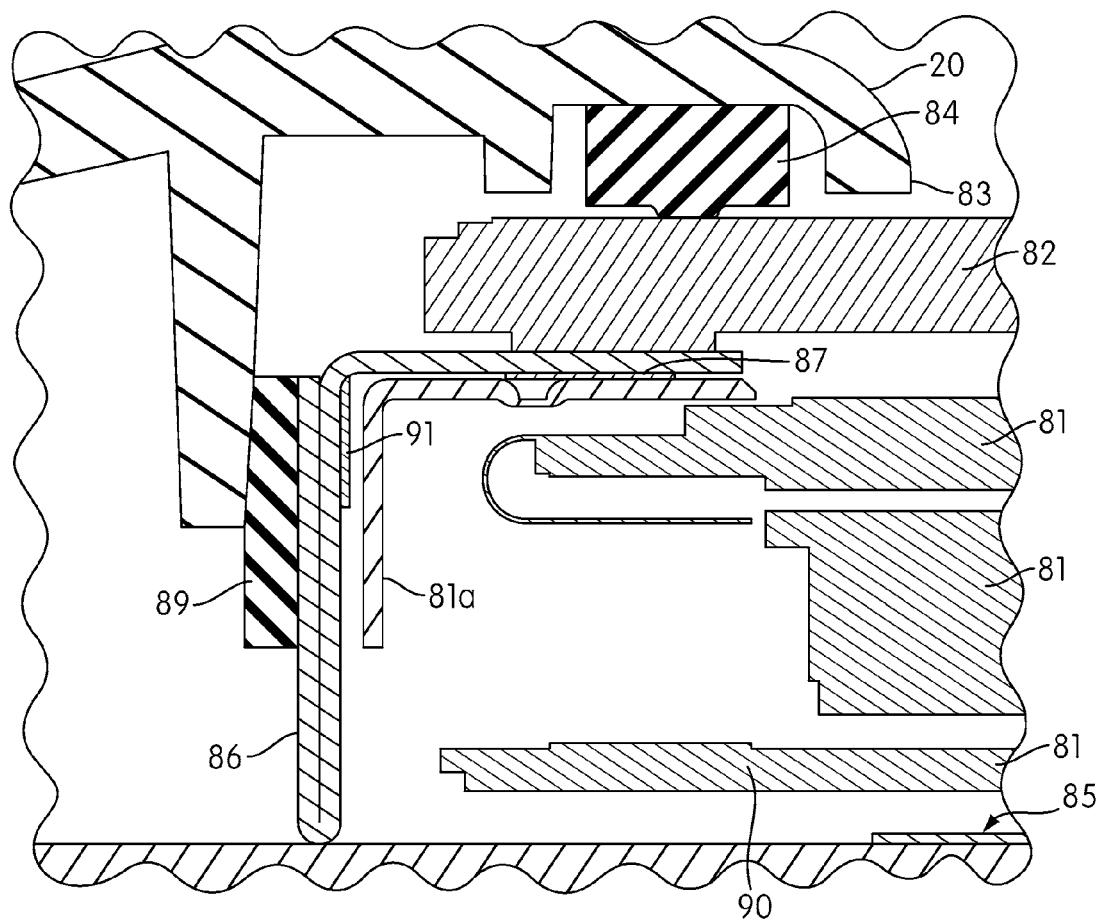
FIG. 28 is a detailed view of the cross-sectional view in FIG. 26.

As shown in FIGS. 1 and 4, the display 80 is supported by the case 20 and electrically connected to the chipset 50 (e.g., a GPU or CPU of the chipset) via the motherboard 40. As shown in FIGS. 26-29, the display 80 includes a screen 81 and a touch panel 82 disposed outwardly from the screen 81. As shown in FIGS. 26-28, the display 80 (and particularly the screen 81 thereof) faces toward the touch panel 82 and outward away from the case 20 through a display opening 83 in the case 20. As shown in FIGS. 4 and 26, a rear side 80*a* of the display 80, including the screen 81, is disposed in the sealed compartment 30.

Hereinafter, the manner in which the display 80 is mounted to the tablet 10 is described with reference to FIGS. 26-29.

As shown in FIGS. 1 and 26-27, the touch panel 82 is accessible through the display opening 83 in the case 20 and the screen 81 is viewable through the opening 83 and transparent portion of the touch panel 82.

As shown in FIGS. 26-28, an elastomeric gasket 84 surrounds a perimeter of the opening 83 and is glued or otherwise adhered in a water-tight manner to the case 20. The gasket 84 and touch-panel 82 press against each other to form a water-tight seal that separates the sealed compartment 30 on the interior side of the touch panel 82 from the wet space 60 on an exterior side of the touch panel 82.

The sealing force exerted between the touch panel 82 and gasket 84 is created by the case 20, a chassis 85, and a frame 86. The chassis 85 mounts to the case 20, or is formed by the case 20. The frame 86 rests on top of the chassis 85. The frame 86 follows the perimeter of the opening 83 and the perimeter of the touch panel 82. A perimeter of the touch panel 82 rests on top of and is supported by the frame 86. The touch panel 82 may be glued or otherwise fastened to the frame 86 (e.g., via double-sided pressure sensitive adhesive tape). Alternatively, the touch panel 82 may be held in place solely by it being sandwiched between the gasket 84 and frame 86.

The compressive force that provides the water-tight seal between the touch panel 82 and gasket 84 is transferred from the case 20 to the chassis 85, from the chassis 85 to the frame 86, from the frame 86 to the touch panel 82, and finally from the touch panel 82 back to the gasket 84 that is supported by the case 20. The compressive force is developed when the case 20 is bolted (or otherwise fastened) together while the chassis 85, frame 86, touch panel 82, and gasket 84 are in place. The tightening of the bolts creates the compressive force as the chassis 85 (and lower portion of the case 20) is pressed toward the upper portion of the case 20.

According to various embodiments of the invention, the direct transfer of sealing force from structural components of the tablet 10 (e.g., the case 10, chassis 85, and frame 86) to the touch panel 82 and gasket 84 facilitates an accurate and precise application of constant sealing force around the entire perimeter of the seal between the gasket 84 and touch panel 82. As shown in FIG. 26, the use of the frame 86 provides for a precise stackup distance between the upper surface of the chassis 85 and the upper surface of the touch panel, which contacts the gasket 84. In the illustrated embodiment, the stackup distance is 9.28 mm, but may be other distances according to other embodiments of the present invention.

Conversely, the sealing force that seals the gasket 84 and touch panel 82 together is not transferred through the display screen 81. Put another way, the screen 81 is isolated from the sealing force exerted between the touch panel 82 and gasket 84. According to various embodiments of the present invention, avoiding such force transfer through the screen 81 may provide several benefits. First, because the screen 81 is slightly compressible according to various embodiments, transferring the sealing force through the screen 81 could result in a less precise stackup distance between the chassis 85 and top surface of the touch panel 82, which could increase the chance of leaks. If the sealing force were transferred through the screen 81, the same compressibility of the screen 81 may result in inconsistent sealing pressure around the perimeter of the seal. Furthermore, compression of the screen 81 that would result from transferring the sealing force through the screen 81 may lead to damage of the screen 81 and light bleed through the compressed pixels of the screen 81, particularly in embodiments where relatively high sealing forces are used to improve the water-tight seal (e.g., increase a water depth to which the seal is water-tight).

Because the water-tight connection between the gasket 84 and touch panel 82 relies on compression rather than a more permanent fastener such as glue, maintenance on the touch panel 82 and removal and replacement of the touch panel 82 is simplified relative to a computer in which the gasket is glued to both the case and the touch panel, which would make it more difficult to remove the touch panel from the case. However, according to an alternative embodiment of the invention, the gasket 84 could be glued to both the case 20 and the touch panel 82 to ensure a water-tight seal even in the absence of compressive sealing force.

In the illustrated embodiment, the gasket 84 is glued to the case 20 and compressed against the touch panel 82. Alternatively, the gasket 84 could be glued to the touch panel 82 and compressed against the case 20 without deviating from the scope of the present invention. According to a further alternative embodiment of the invention, the connections between the gasket 84 and both the case 20 and touch panel 82 could rely on a compression seal, rather than glue or another intermediary adhesive.

In the illustrated embodiment, the chassis 85 comprises magnesium, and the frame 86 comprises stamped, bent, 0.3 mm stainless steel. However, the chassis 85 and frame 86 may alternatively comprise other materials without deviating from the scope of the present invention. According to an alternative embodiment, the frame 86 and chassis 85 are integrally formed (e.g., via common casting or subsequent permanent bond).

As shown in FIGS. 26 and 28, an upper side of a structural frame 81*a* of the screen 81 is mounted to the frame 86 via double-sided, pressure sensitive adhesive tape 87 (or another suitable fastener).

As shown in FIGS. 26 and 27, the frame 86 has an "L" shaped cross-sectional shape. The structural connection between the chassis 85 and frame 86 is on an opposite leg of the "L" from the structural connection between the frame 86 and touch panel 82. Similarly, the structural connection between the chassis 85 and frame 86 is on an opposite leg of the "L" from the structural connection between the frame 86 and the screen 81. According to one or more embodiments, the frame 86 comprises a material with some elastic properties (e.g., stainless steel), such that the "L" shape can flex to some degree to permit limited movement of the opposite legs of the frame 86 relative to each other. Such elastic deformation enables the frame 86 to protect the touch panel 82 and screen 82 from vertical shocks and vibrations that might otherwise be transferred from the chassis 85 to the touch panel 82 and screen 81 via the frame 86. According to various embodiments of the invention, the elasticity of the "L" shape also facilitates a more consistent sealing pressure around the perimeter of the touch panel 82.

Figure 29:
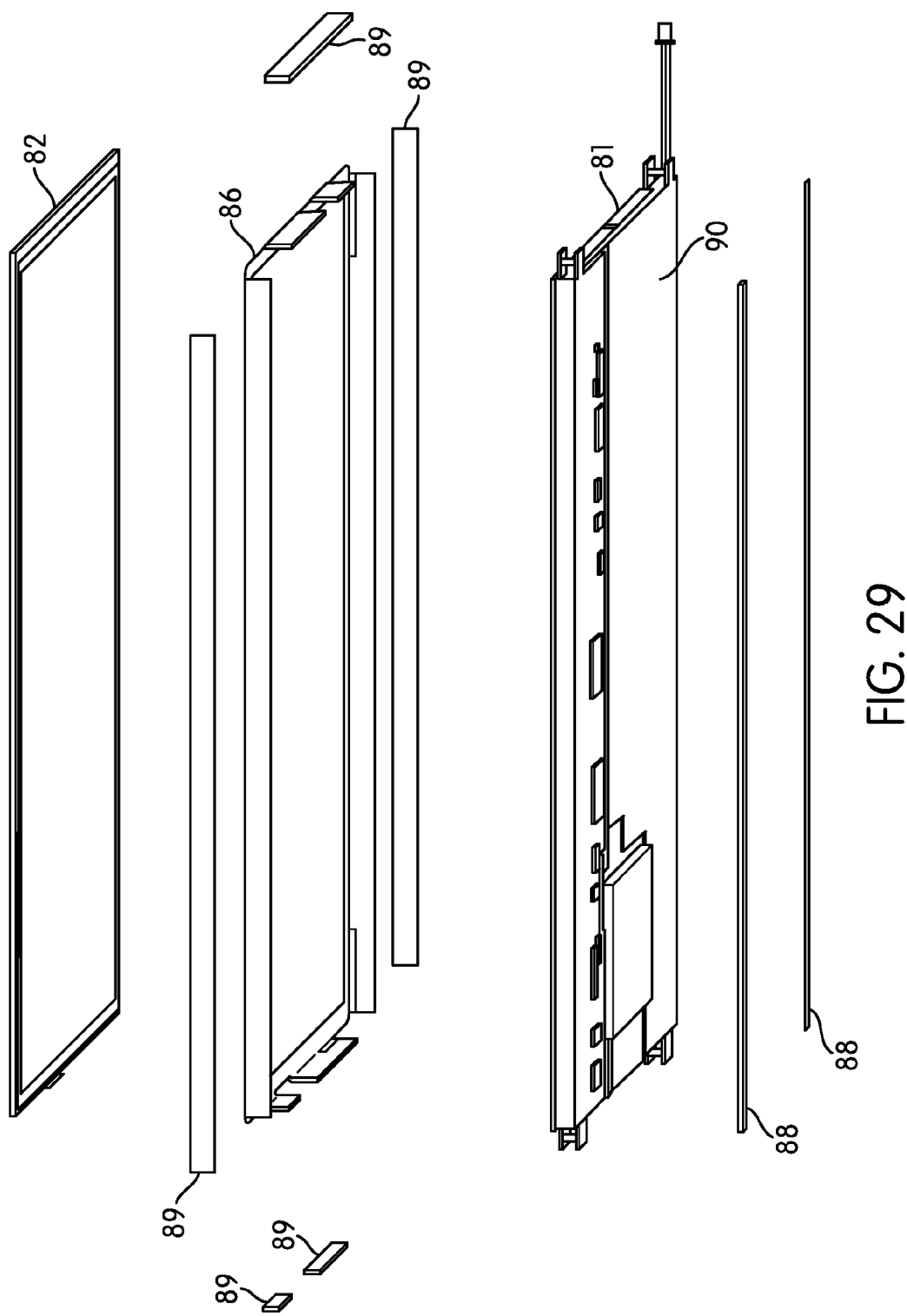
FIG. 29 is a perspective exploded view of the display and supporting frame of the computer of FIG. 1.

As shown in FIGS. 27 and 29, a lower side of the screen 81 is supported by the chassis 85 via intermediary strips of silicon rubber 88 that protect the screen 81 from vertical shocks and vibrations imparted on the case 20 (e.g., if the tablet 10 was dropped on its rear face opposite the display 80).

As shown in FIGS. 26-29, strips of silicon foam 89 are disposed between the sides of the frame 86 and the chassis 85 or case 20. The strips 89 protects the frame 86 and screen 81 and touch panel 82 mounted thereto from lateral/side shocks and vibrations imparted on the case 20.

The strips 88, 89 may be held in place via any suitable fastener (e.g., glue, tape, incorporation of the strips 88, 89 into single-sided or double-sided foam/rubber tape).

In the illustrated embodiment, the strips 88 comprise silicon rubber and the strips 89 comprise silicon foam. However, according to alternative embodiments of the present invention, the strips 88, 89 may alternatively comprise any other suitable material (e.g., an elastomer, an elastic material, foam, rubber, etc.) without deviating from the scope of the present invention.

As shown in FIGS. 26-29, the frame 86 laterally surrounds the screen 81. Mylar frame spacers 91 are fastened to the inner lateral corners of the frame 86. The spacer 91 are disposed laterally adjacent to the frame 81a of the screen 81 to ensure proper lateral positioning of the screen 81 relative to the touch panel 82 and case 20.

According to an alternative embodiment of the invention that provides an alternative user interface (e.g., a keyboard and/or mouse or other pointing device), the touch panel 82 can be replaced by a transparent sheet of material such as a sheet of glass or plastic, or omitted altogether.

Thus, one or more embodiments of the invention provide an electronics device comprising:

a case having a sealed compartment and a display opening;

a display screen disposed in the sealed compartment and viewable through the opening;

a touch panel disposed outwardly of the screen; and a gasket disposed between the touch panel and the case, the gasket and touch panel sealing the opening to separate the sealed compartment from an environment surrounding the electronics device, wherein the electronics device creates a sealing force that urges the touch panel toward the opening relative to the case and against the gasket to seal the opening via the gasket, and wherein the sealing force is not transferred through the display screen.

According to one or more of these embodiments, the display screen is isolated from the sealing force.

According to one or more of these embodiments, the electronics device comprises a computer, and the computer includes a chipset disposed in the sealed compartment, the chipset being electrically connected to the display screen and touch panel.

According to one or more of these embodiments, the electronics device comprises a frame through which the sealing force is transferred, wherein the screen and touch panel are both supported by the frame.

According to one or more embodiments, the screen 81 comprises a high intensity/brightness screen 81 (see FIG. 1) that facilitates improved viewability of the screen 81 in bright environments (e.g., outdoors in direct sunlight). The screen 81 may be an LED, CCFL, or OLED display (e.g., a high intensity, advanced fringe field switching (AFFS) screen module from Hydis Technologies Co.). One or more embodiments of the screen 81 provide a brightness of at least 500 NIT (a luminance unit equal to 1 candle per square meter measured perpendicular to the rays from the source), at least 600 NIT, at least 700 NIT, and/or somewhere between 500 and 1000 NIT across its viewable area. According to various embodiments, the screen 81 of the display 80 is at least a 6, 7, 8, 9, 10, 11, 12, and/or 13 inch screen, measured diagonally. According to various embodiments, a viewable area of the screen 81 is at least 15, 20, 25, 30, 35, 40, 45, 50, 60, 70, 80, 90, and/or 100 square inches. According to one embodiment, the screen 81 is a 10.4 inch diagonal screen having a 4:3 aspect ratio and a viewable area of about 52 square inches. According to various embodiments, the screen 81 releases at least 1, 2, 3, 4, 5, 6, 7, 8, 9, and/or 10 or more watts of heat into the sealed compartment 30 when operated in high brightness/intensity mode.

The screen 81 comprises a heat sink 90 (see FIGS. 4 and 29) disposed on a rear side of the screen 81 in the sealed compartment 30 to dissipate heat from the high-intensity screen 81 into the sealed compartment 30. The heat sink 90 may span a large portion of an area of the screen 81 and comprise a high-heat conductivity material such as aluminum.

The touch panel 82 provides a user-interface for the tablet 10. According to one or more embodiments, the touch panel 82 is a multi-mode touch panel 82 that provides for user (or tablet 10) selection between the following modes: a touch only operating mode, a stylus only operating mode, and a dual mode with the stylus operation taking priority over touch operation.

The high-intensity screen 81 and high-power chipset 50 (and specifically the processor 70 and PCH 75 thereof) dissipate a large amount of heat into the sealed compartment 30. Because the compartment 30 is sealed according to one or more embodiments, the compartment 30 according to one or more embodiments does not dissipate heat into the ambient environment as well as various unsealed compartments would. Moreover, according to one or more embodiments, the display 80, chipset 50, and other components in the sealed compartment 30 generate so much heat that a passive heat exchanger incorporated into the case 20 (e.g., a metal heat sink that thermally connects the sealed compartment 30 to the wet space 60) would get so hot that it would be uncomfortable for some users to touch. As explained below, the active coolant remote heat exchanger (RHE) 100 dissipates such heat and facilitates the use of a high-intensity display 80 (e.g., 500+ NIT) and/or the combined use of a high intensity display 80 (500+ NIT) and a high power CPU 70 that generates 5, 6, 7, 8, 9, and/or 10 watts or more of heat.

Hereinafter, the RHE 100 is described with reference to FIGS. 4 and 22.

Figure 22:
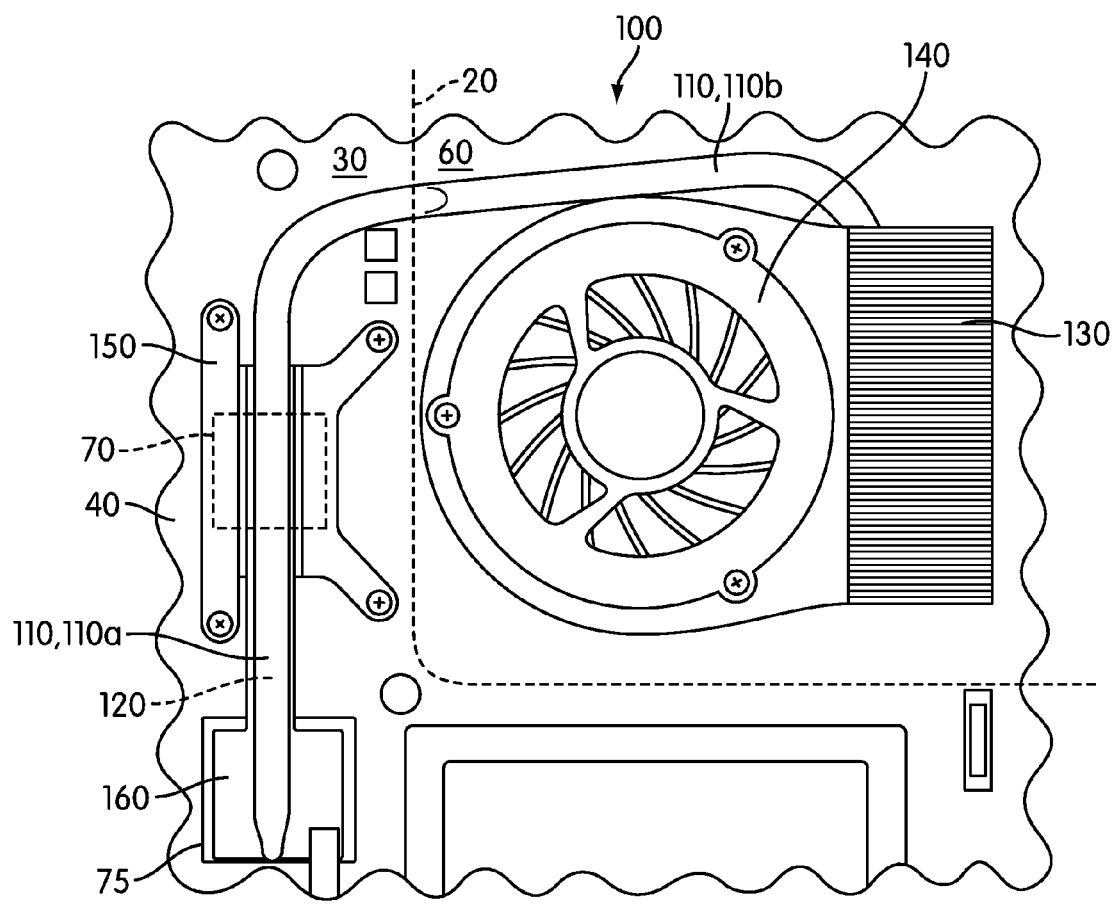
FIG. 22 is a partial front view of a motherboard and remote heat exchanger of the computer of FIG. 1.

As shown in FIGS. 4 and 22, the RHE 100 is supported by the case 20 and is constructed and positioned to draw heat from within the sealed compartment 30 and dissipate the heat into the ambient environment/wet space 60 around the tablet 10. The RHE 100 includes a coolant passage 110, a coolant 120, a heat sink 130, and a fan 140.

As shown in FIGS. 4 and 22, the coolant passage 110 (also known as a heat pipe) contains the coolant 120, whose flow is configured to carry heat out of the sealed compartment 30 and into an ambient air/wet space 60 outside of the sealed compartment 30. The coolant passage 110 has a first portion 110a that is thermally exposed to the sealed compartment 30, and a second portion 110b disposed outside of the sealed compartment 30. Heat-induced evaporation of the coolant in the first portion 110a and cooling-induced condensation of the coolant 120 in the second portion 110b cause the coolant 120 to flow between the first and second portions 110a, 110b, thereby carrying heat out of the sealed compartment 30.

According to one or more embodiments, the first portion 110a of the coolant passage 110 is thermally coupled to the processor 70 (e.g., via direct contact, through mutual contact with an intermediary heat transfer medium, via mutual contact with an intermediary heat sink 150 (see FIG. 22), etc.) so as to pull heat directly from the heat-producing processor 70. As shown in FIG. 22, the heat sink 150 is spring-loaded to as to press against the processor 70, thereby keeping the processor 70 in place. The heat sink 150 is thermally coupled to first portion 110a so as to thermally couple the first portion 110a to the processor 70. Additionally and/or alternatively, the first portion 110a may be thermally coupled to other heat producing components of the tablet 10 so as to better dissipate heat generated within the sealed compartment 30. For example, as shown in FIG. 4, the first portion 110a is thermally coupled to the heat sink 90 of the display 80. As shown in FIG. 22, the first portion 110a is also thermally coupled to the PCH 75 via an intermediate heat sink 160. The first portion 110a also extends within the sealed compartment 30 so as to generally pull heat from the space within the sealed compartment 30. The heat sinks 150, 160 also serve as general heat sinks for the first portion 110a to help the first portion 110a absorb heat from within the sealed compartment 30.

According to one or more embodiments, the sealed compartment 30 is fan-less, and the RHE 100 relies on natural circulation of gas within the sealed compartment 30 and/or heat transfer through the gas in the sealed compartment 30 to transfer heat from various components in the sealed compartment 30 to the first portion 110a.

As shown in FIGS. 4 and 22, the heat sink 130 is supported by the case 20, disposed in the wet space 60, and thermally coupled to the second portion 110b. As shown in FIG. 22, the heat sink 130 comprises a plurality of heat-dissipating fins.

As used herein, the term "thermal coupling" means a coupling that facilitates more heat transfer between components than would be provided if the components were separated by an air gap. Thermal coupling may comprise direct contact between components. Thermal coupling may comprise the use of an intermediary structure between the components, wherein the intermediary structure is designed to improve heat transfer between the components (e.g., a high thermal conductivity metal in mutual contact with both components, a high thermal conductivity paste in mutual contact with the components, etc.).

As used herein, the term "remote" in "remote heat exchanger" means that a portion of the heat exchanger is disposed remote from another portion of heat exchanger (e.g., one portion being disposed in a position to absorb heat, and a "remote" portion being disposed in a position to expel heat). Here, the portion 110a of the RHE 100 is disposed in the sealed compartment 30, and is therefore remote from the portions 110b (and fan 140 and heat sink 130), which is disposed in the wet space 60. The portions 110a, 110b are "remote" from each other despite both being part of the tablet 10.

Figure 2:
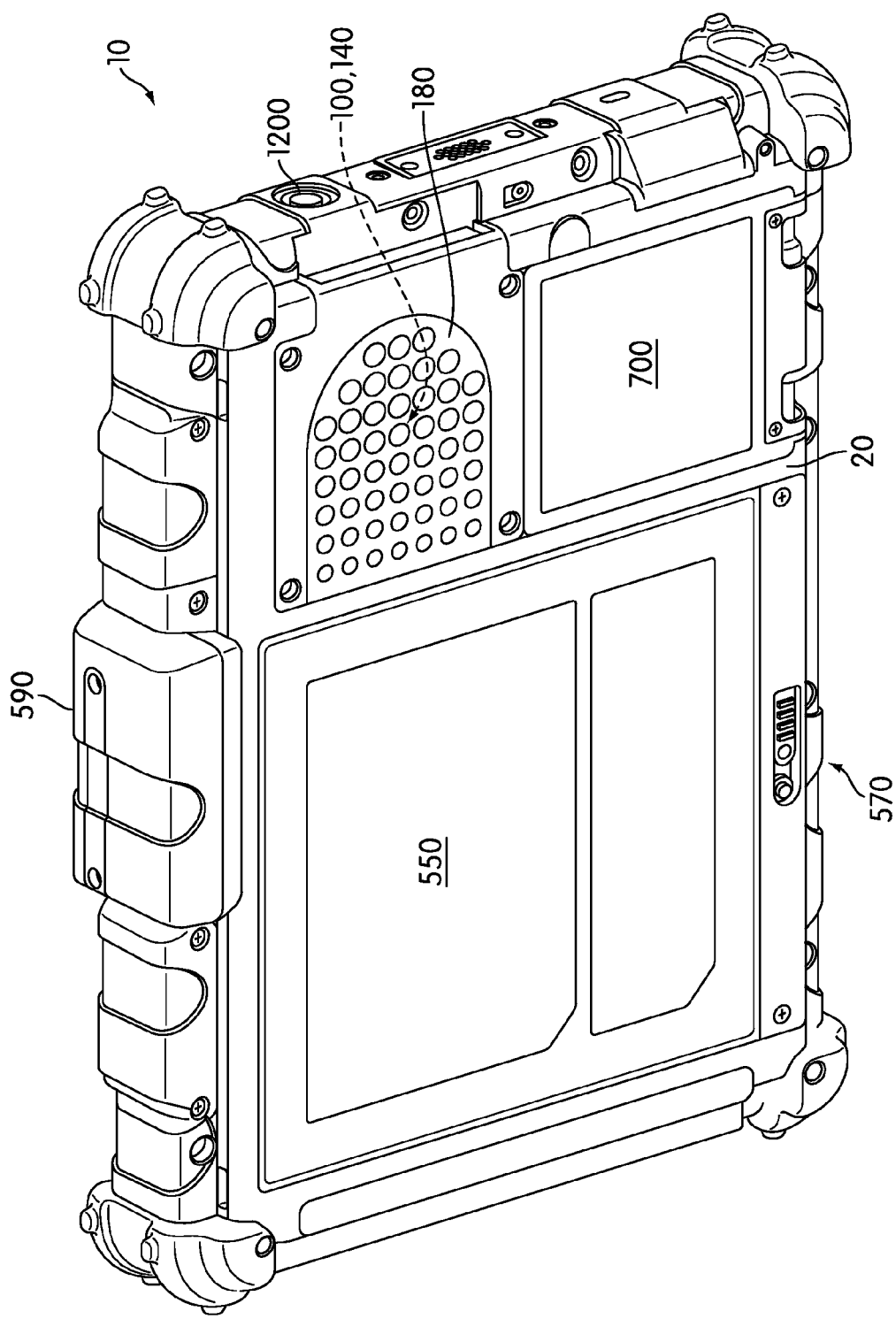
FIG. 2 is rear perspective view of the computer of FIG. 1.
Figure 3:
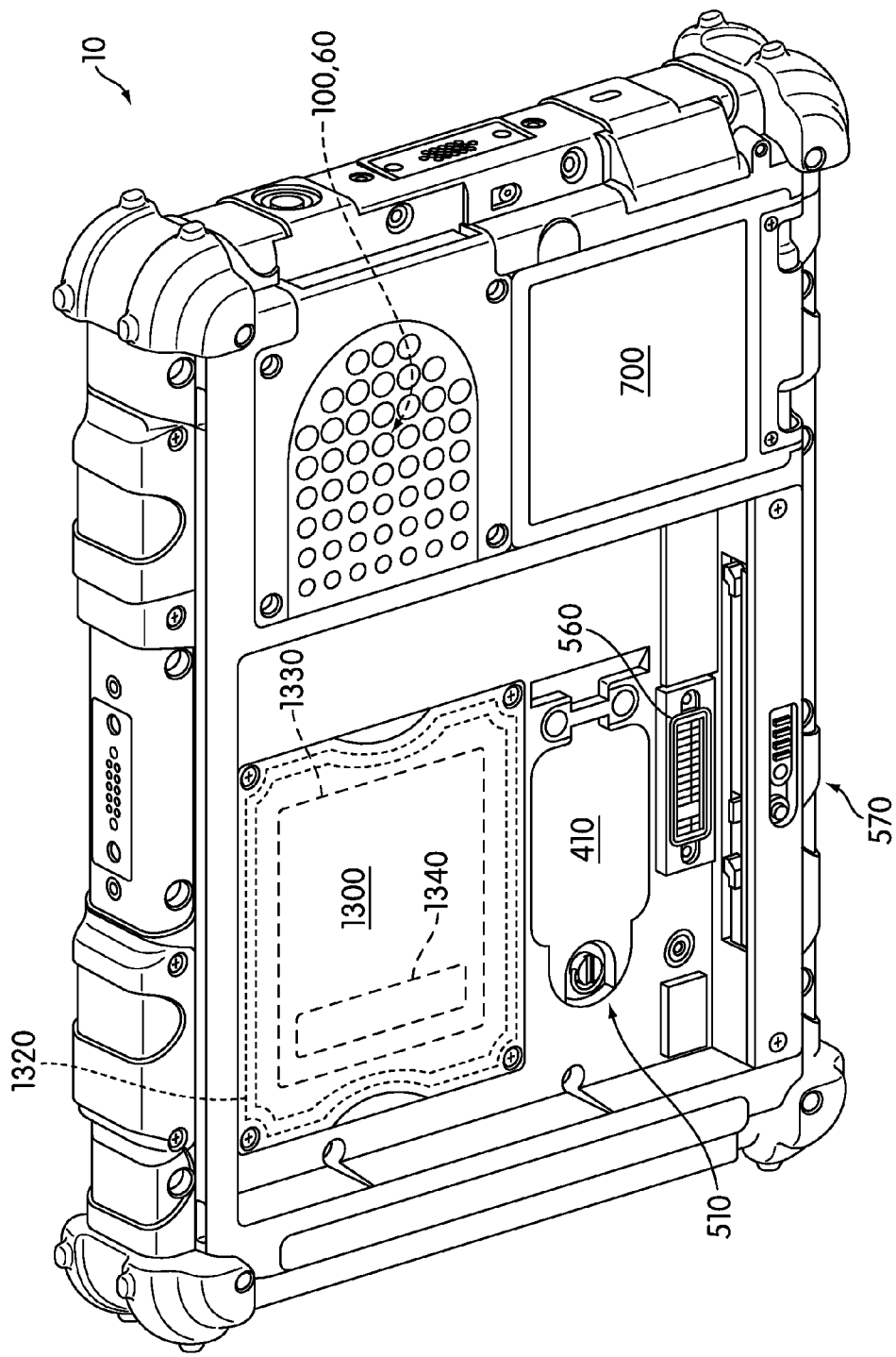
FIG. 3 is rear perspective view of the computer of FIG. 1 with its battery removed.

The fan 140 is supported by the case 20 and disposed outside of the sealed compartment 30 in the wet space 60. The fan 140 is powered by the battery 550. The fan 140 is positioned to direct a flow of ambient air over the heat sink 130 so as to facilitate heat transfer from the heat sink 130 to the ambient air. The fan 140 is connected to the motherboard 40 and controlled by the chipset 50. For example, to conserve battery 550 power, the chipset 50 may turn the fan 140 on when a temperature in the sealed compartment 30 exceeds a threshold and turn the fan 140 off when the temperature is below a threshold. As shown in FIGS. 2 and 3, the holed fan cover 180 covers the fan 140 and allows fan-induced ambient air flow through the cover 180. According to one or more embodiments, the fan cover 180 comprises plastic to minimize heat transfer to the user through via the cover 180.

Although a particular RHE 100 is illustrated, a variety of other RHEs could alternatively be used without deviating from the scope of the present invention. Moreover, according to one or more embodiments, the RHE 100 may be eliminated altogether or replaced with a passive heat exchanger such as a passive heat sink, for example if the heat output within the sealed compartment 30 is below a certain threshold.

As shown in FIG. 4, a plurality of electronics interfaces 200 are provided on or otherwise electrically connected to the motherboard 40 and chipset 50 to facilitate electric connections between and among the peripheral electronics devices, tablet 10 components, and the chipset 50, among others. Such electronics interfaces 200 may include, among others, PCI-X slots, mini-PCI Express slots 210, 220 (see FIG. 5), USB interfaces, a speaker port 230 (e.g., a 3.5 mm jack) or built in speaker, a microphone port 240 (e.g., a 3.5 mm jack) or built in microphone, docking port interfaces 250, an electronics interface 400, a SIM card interface 430, a memory card interface 450, etc.

Figure 6:
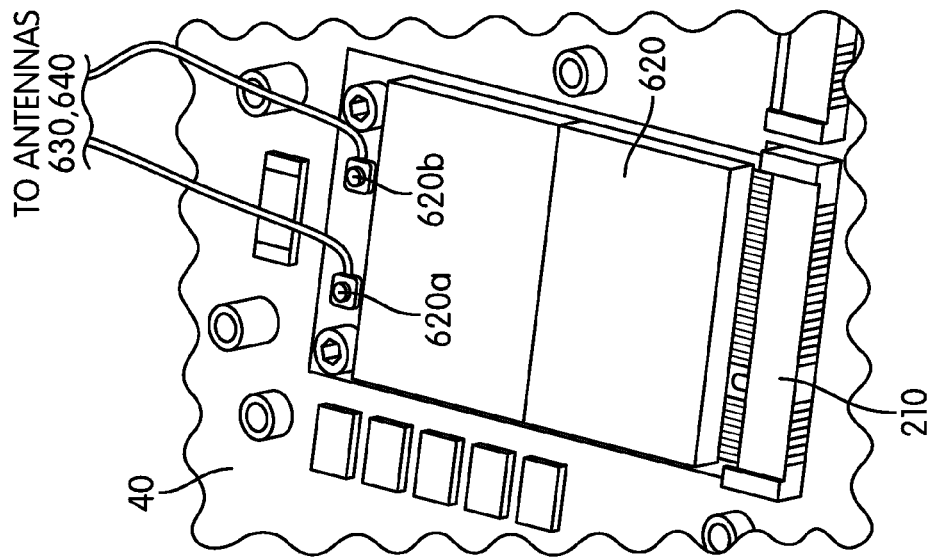
FIG. 6 is a partial rear perspective of a motherboard of the computer with a radio connected to an interface of the computer.
Figure 5:
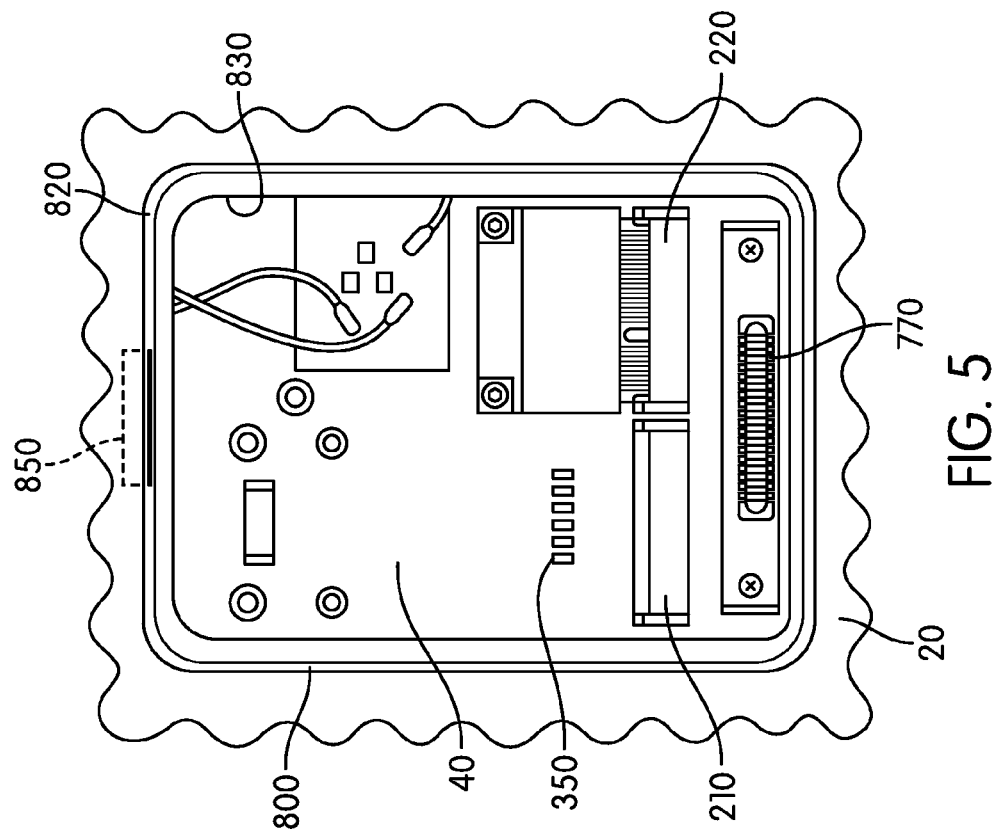
FIG. 5 is a partial rear view of the computer of FIG. 1, with an electronics cartridge removed to show several electronics interfaces of the computer.

As shown in FIGS. 5 and 6, the mini-PCI Express slot/interface 210 facilitates connection to the motherboard 40 and chipset 50 of a peripheral electronics device such as a mini-PCI Express card 620 (e.g., a wireless wide area network (WWAN) data packet radio card 620) via the mini-PCI Express interface specification. The chipset 50 supports the mini-PCI Express interface specification (e.g., via a suitable PCI controller). Although the slot 210, card 620, and chipset 50 rely on the mini-PCI Express interface specification, any other suitable interface specification may be used without deviating from the scope of the present invention.

Hereinafter, the interface converter/adapter 300 is described with reference to FIGS. 4-11.

The mini-PCI Express interface specification does not support various signals. For example, the specification does not support voice communications (e.g., analog speaker and microphone signals). In order to facilitate use of such expanded capabilities (e.g., radios with voice capability), a removable interface converter 300 is used. As explained in greater detail below, the converter 300 converts the mini-PCI Express interface 210 into a specialized, voice-capable mini-PCI Express interface 340 without the need to add a stand alone, specialized voice-capable interface to the tablet 10. The converter 300 therefore provides increased functionality to the tablet 10, without taking up significant additional space in the tablet 10.

Figure 8:
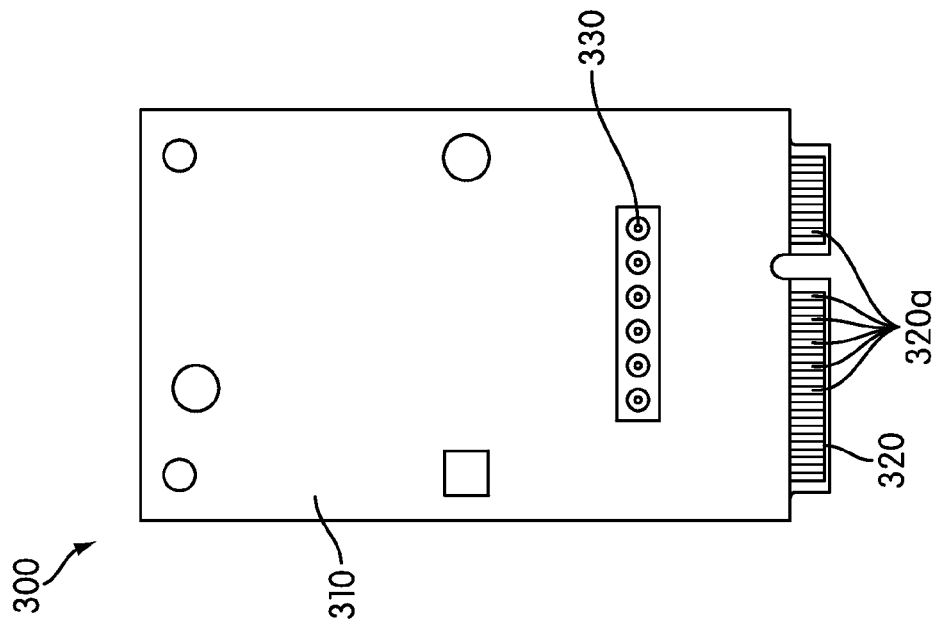
FIG. 8 is a rear view of the interface converter of FIG. 7.
Figure 7:
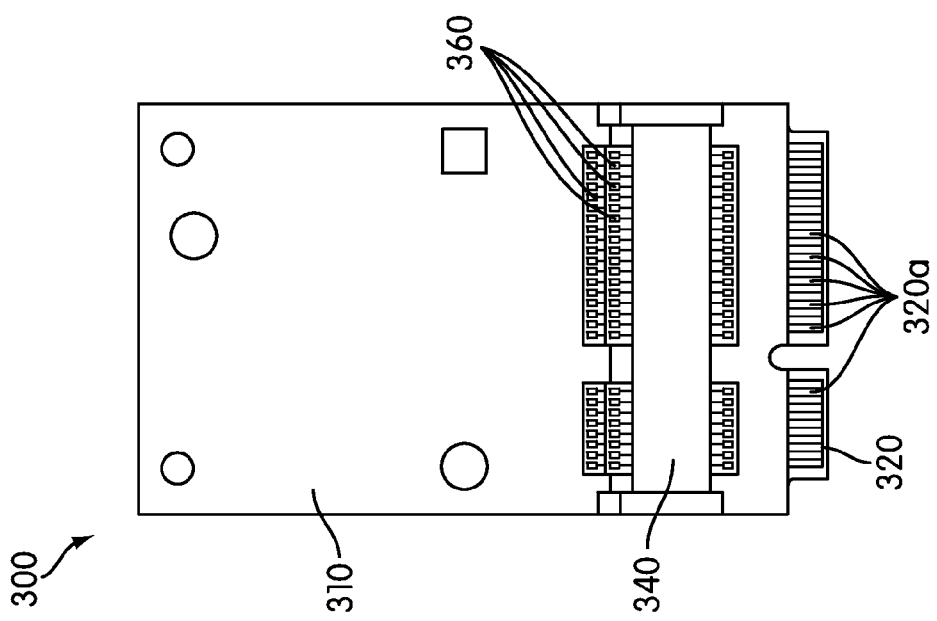
FIG. 7 is a front view of an interface converter that may be used in conjunction with the computer of FIG. 1.

As shown in FIGS. 7 and 8, the converter 300 comprises a substrate 310 (e.g., a PCB), a mini-PCI Express connector 320, a plurality of pogo pins 330, and a specialized mini-PCI Express interface/slot 340.

Figure 9:
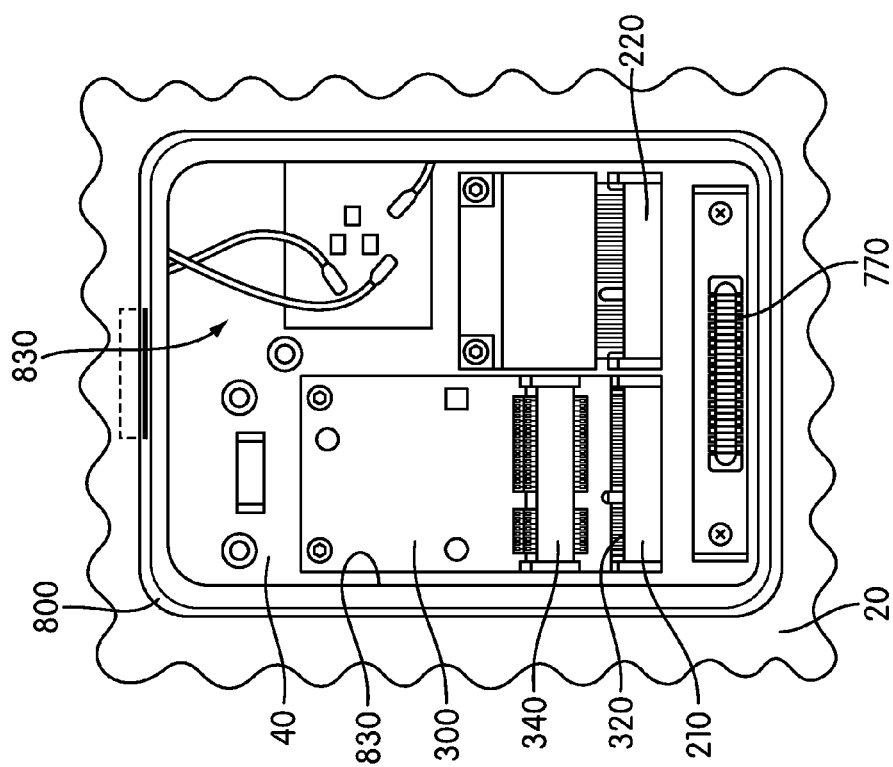
FIG. 9 is a partial rear view of the computer of FIG. 1, with the converter of FIG. 7 mounted to an interface of the computer.
Figure 11A:
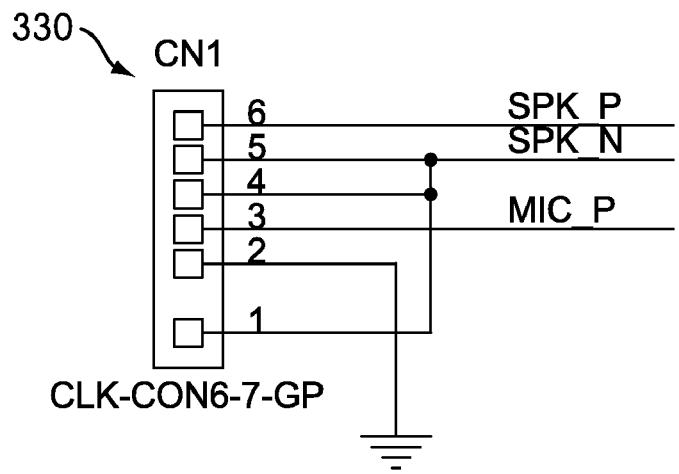
FIGS. 11A-11E are wiring/pin layout diagrams for the interface converter of FIG. 7.
Figure 11B:
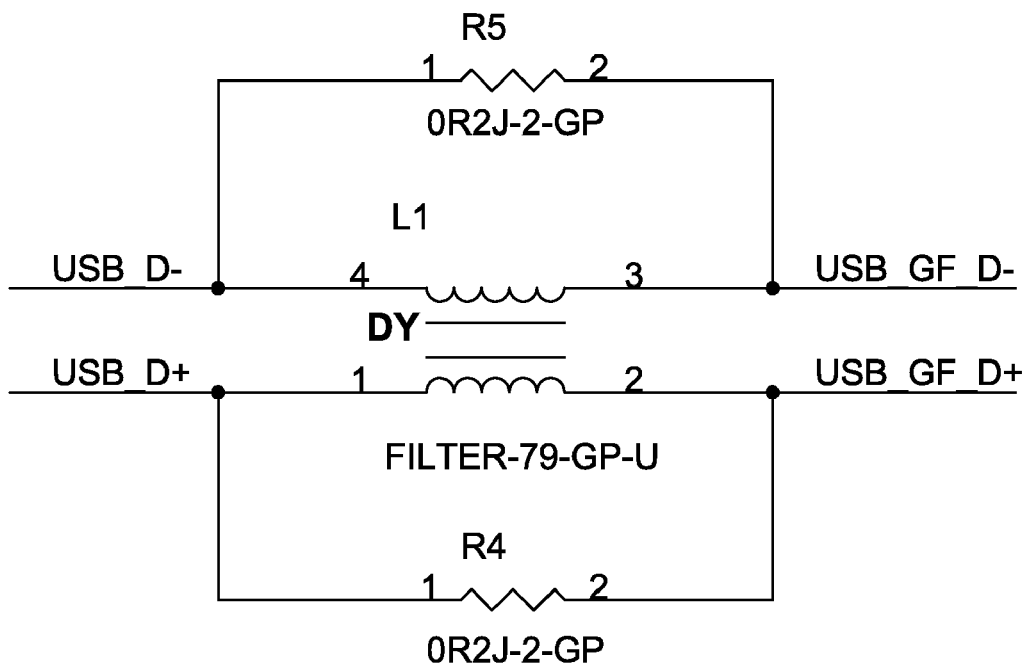
Figure 11C:
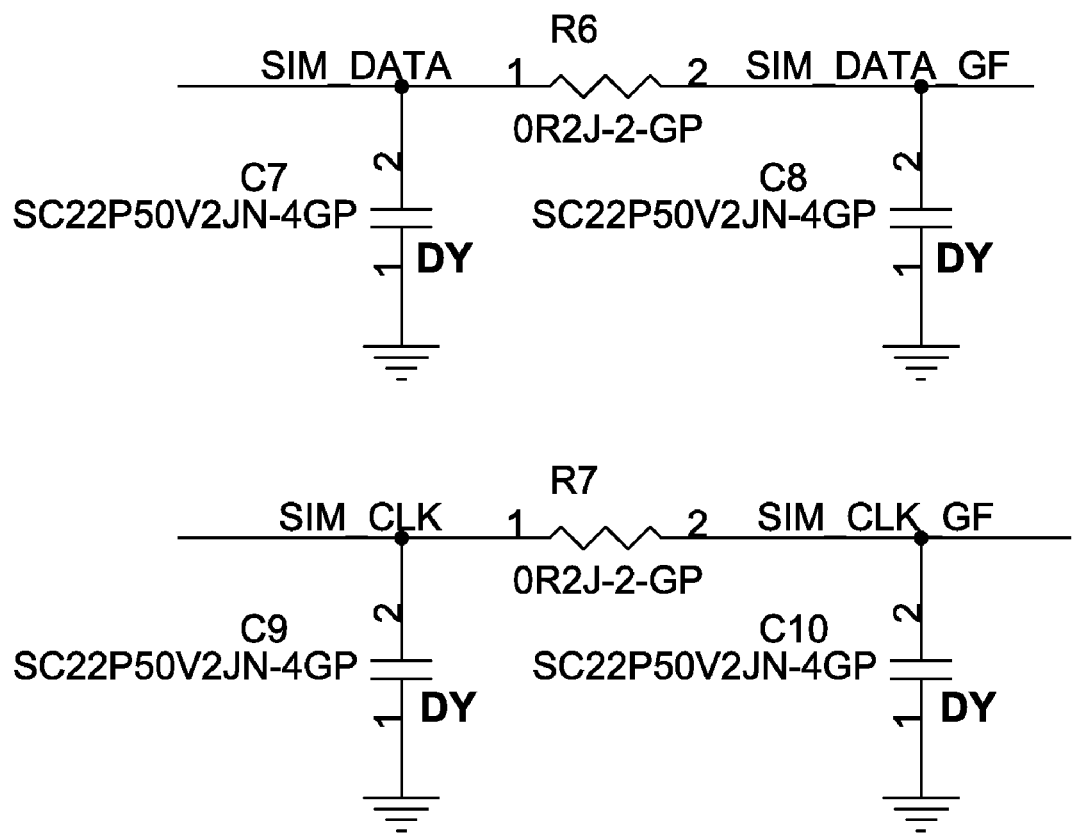
Figure 11D:
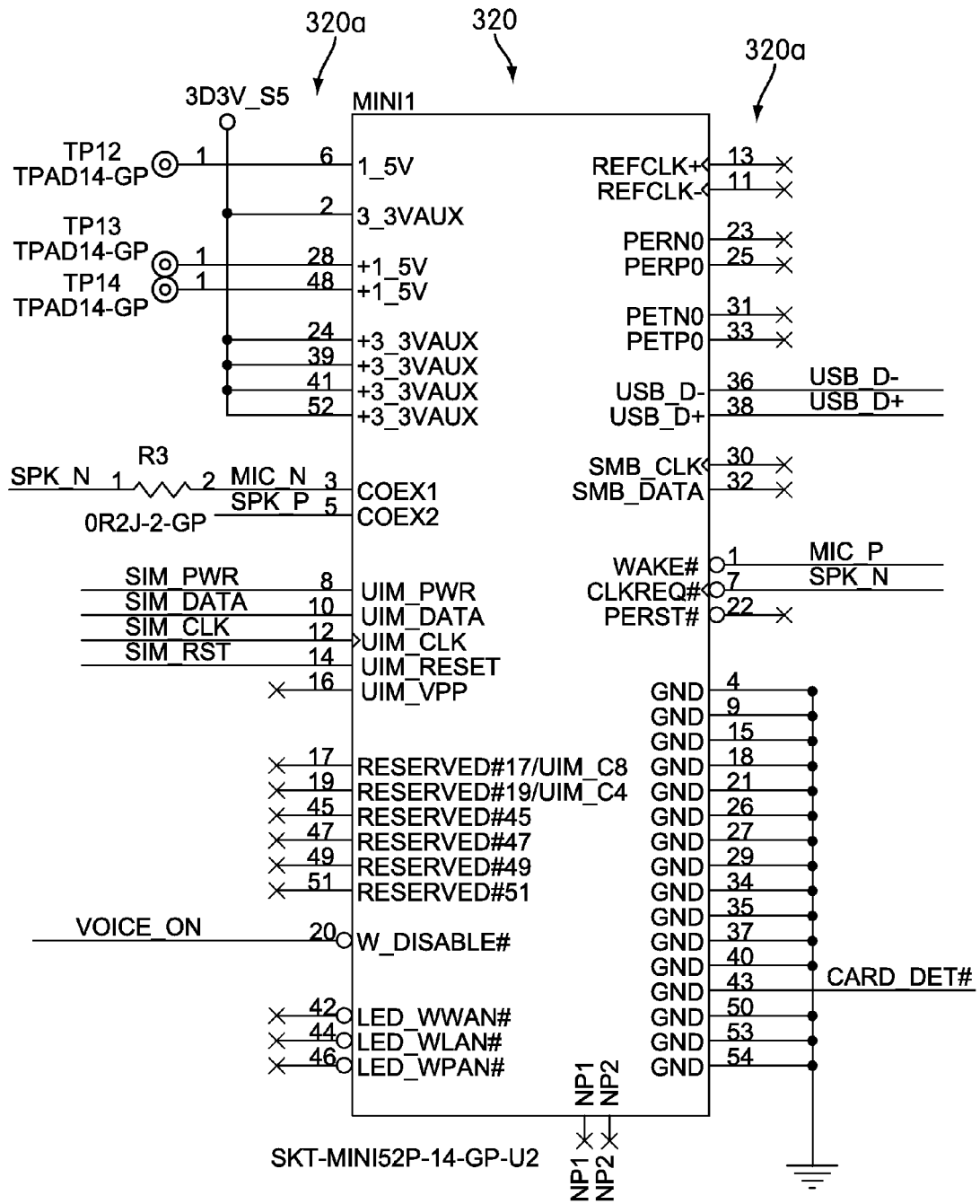
Figure 11E:
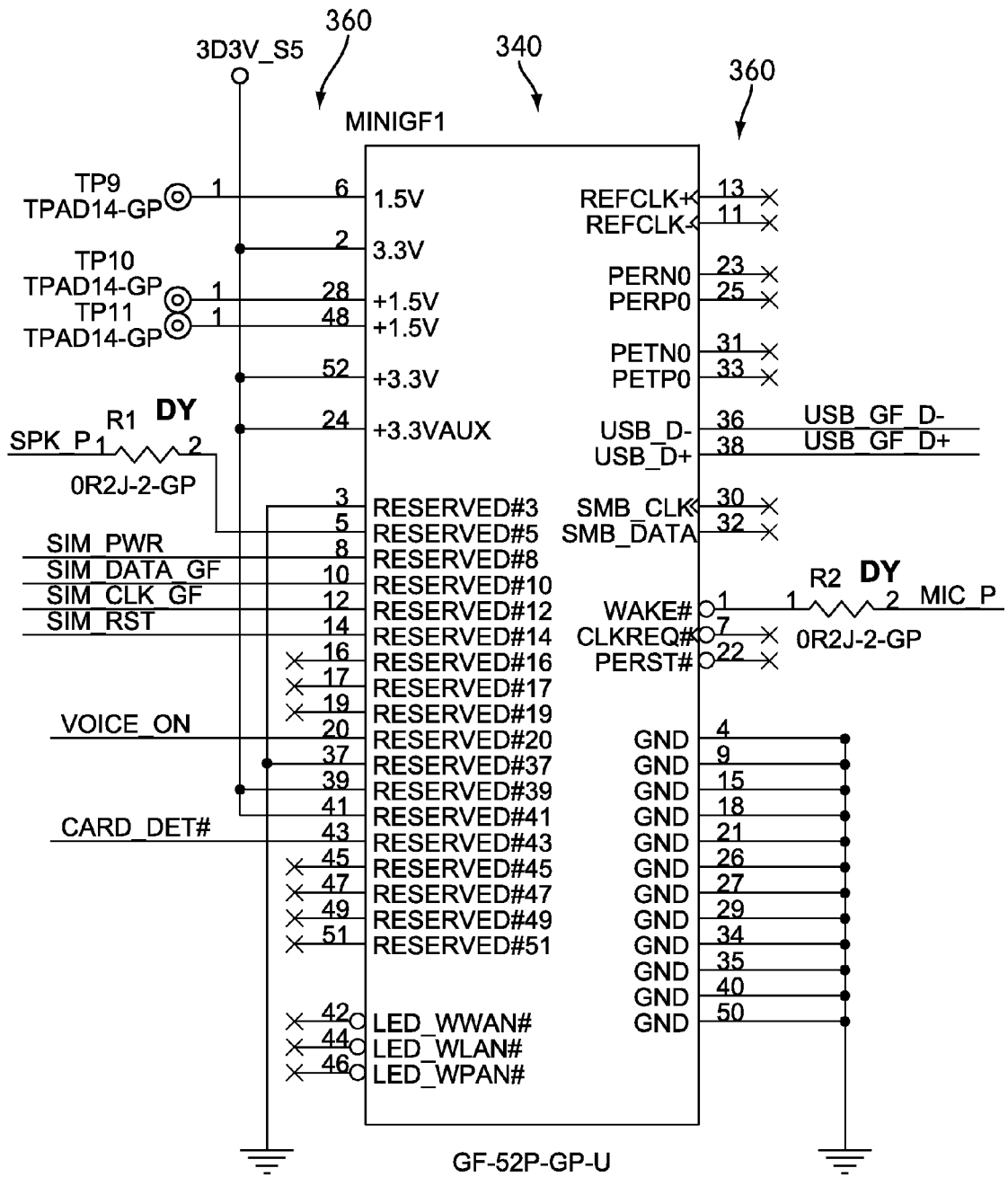

As shown in FIGS. 7 and 8, the mini-PCI Express connector 320 is supported by the substrate 310 and includes a plurality of edge finger electric contacts 320a. As shown in FIG. 9, the connector 320 of the converter 300 is removably physically and electrically engageable with the mini-PCI Express interface 210. The connection between the connector 320 and interface 210 via the electric contacts 320a provides for communication according to the mini-PCI Express interface specification. However, any other suitable interface specification and interface type may be used without deviating from the scope of the present invention (e.g., mini-PCIexpress, USB, PCMCIA, SATA, I^2 C, or any other suitable electronics bus). This mini-PCI Express connection provides power, USB, mini-PCIexpress, I^2 C, and SIM signals to the converter 300 according to the mini-PCI Express interface specification. However, as noted above, the mini-PCI Express interface specification does not provide for analog voice signals.

The converter 300 is provided with voice signals (or other types of communication signals not provided via the mini-PCI Express interface specification) via the pogo pins 330 (see FIG. 8) and a plurality of corresponding electric contacts 350 (see FIG. 5) on the motherboard 40. As shown in FIG. 8, the plurality of pogo pins 330 are supported by the substrate 310. The pogo pins 330 are spring-biased electric contacts.

As shown in FIGS. 4 and 5, the plurality of corresponding electric contacts 350 are supported by the motherboard 40 and electrically connected to the chipset 50, which may connect the contacts 350 to suitable devices such as the microphone 240 (or microphone port such as a 3.5 mm jack accessible from outside of the tablet 10) and speaker 230 (or speaker port such as a 3.5 mm jack accessible from outside of the tablet 10).

As shown in FIG. 9, when the connector 320 physically engages the PCI slot 210, the pogo pins 330 align with and electrically contact the electric contacts 350. Thus, the converter 300 is removably connectable to the interface/slot 210 and the electric contacts 350.

While the illustrated connection between the contacts 330 and contacts 350 utilize pogo pins 330 on the substrate 310 and contact pads 350 on the motherboard 40, respectively, any other suitable electric contacts/connections may be used without deviating from the scope of the present invention.

As shown in FIG. 8, the contacts 320a are physically separated or spaced from the contacts 330. The connector 320 and its contacts 320a are disposed at an end of the substrate 310. In contrast, the contacts 330 are disposed at a central portion of the substrate 310 that is spaced from the end, and spaced from all of the peripheral edges of the substrate 310.

The specialized mini-PCI Express interface/slot 340 is supported by the substrate 310 and comprises a plurality of electric contacts 360. Some of the electric contacts 360 are connected/routed to some of the electric contacts 320a, respectively. Others of the electric contacts 360 are connected/routed to the electric contacts 330, respectively. FIGS. 11A-11E provide the pin callouts/connections for the contacts 330, contacts 320a, and contacts 360 of the converter 300 according to an embodiment of the invention. The combination of electric contacts 320a, 330 that are routed to the interface 340 and its contacts 360 define pin callouts for an interface specification that differs from the specification of the interface 210 (e.g., by providing/supporting analog voice (e.g., speaker/microphone) capabilities that are not provided by the interface specification of the interface 210).

Although the illustrated converter 300 provides a voice-capable interface according to a voice-capable interface specification, the converter 300 and contacts 330, 350 may alternatively provide any other useful signal functionality to support any other suitable interface specifications without deviating from the scope of the present invention.

Figure 10:
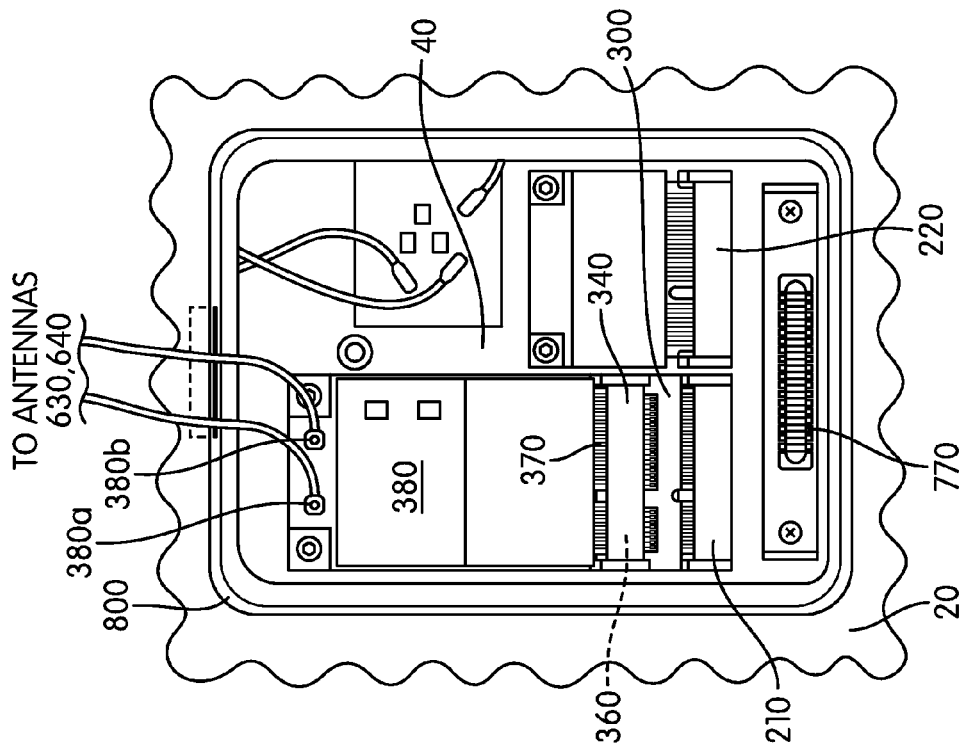
FIG. 10 is a partial rear view of the computer of FIG. 1, with the converter of FIG. 7 mounted to the computer and a radio mounted to the converter.

As shown in FIG. 10, the interface 340 is configured to engage an interface connector 370 of a peripheral electronics device 380 via the plurality of electric contacts 360 according to the voice-capable interface specification. In the illustrated embodiment, the device 380 is a voice-capable radio 380. The chipset 50 is configured to receive analog speaker signals from the interface 340 and device 380 via at least one of the electric contacts 330, 350. Similarly, the chipset 50 is configured to send analog microphone signals to the interface 340 and device 380 via at least one of the first electric contacts 330, 350. Thus, the converter 300 facilitates electrical connection of the device 380 to the tablet 10 (and chipset 50) via a combination of the interface 210 and the contacts 350, 330 according to a voice-capable interface specification.

In the illustrated embodiment, the interface 340 and connector 370 have the form factor and pin positions of a conventional mini-PCI Express interface/card, but utilize the non-standard pin callouts for the voice-capable interface specification (sometimes referred to as a specialized mini-PCI Express interface). According to alternative embodiments of the present invention, the interface 340 and connector 370 may use any other suitable form factor, pin positions, and/or connection type without deviating from the scope of the present invention.

Hereinafter, the door-mounted electronics interface 400 and associated door 410 are described with reference to FIGS. 12 and 13.

As shown in FIGS. 12 and 13, an electronics interface 400 mounts to a door 410 and electrically connects to the chipset 50 via an electrical connector 480.

The electronics interface 400 is configured to removably engage at least one electronics device (e.g., SIM card 440, microSD card 460). In the illustrated embodiment, the electronics interface 400 comprises a substrate 420 (e.g., one or more PCBs), a SIM card interface/slot 430 for a SIM card 440, and a memory card interface/slot 450 for a memory card 460 (e.g., flash memory, SD, SDHC, microSD, microSDHC). However, additional and/or alternative types of electronics interfaces may be provided by the interface 400 without deviating from the scope of the present invention.

The door 410 mounts to the case 20 for pivotal movement relative to the case 20 between an open position (shown in FIG. 12) and a closed position (shown in FIGS. 3, 13). According to one or more embodiments of the invention, provision of the interface 400 on the door 410 provides easier access to, removal of, and insertion of the SIM card 440 and memory card 460 than is provided according to various conventional computers in which a SIM/memory interface is disposed in a deep recess in the case of a computer.

Although the illustrated door 410 pivotally mounts to the case 20, any other type of movable connection could alternatively be used without deviating from the scope of the present invention.

As shown in FIGS. 12 and 13, the electrical connector 480 comprises a plurality of electric contacts in the form of pogo pins that are mounted to and project from the substrate 420. The pogo pins 480 are electrically connected to the interfaces 430, 450 so as to electrically connect to the cards 440, 460 when the cards 440, 460 are connected to the interfaces 430, 350. As also shown in FIGS. 12 and 13, a plurality of corresponding electric contacts 490 are supported by the motherboard 40 and electrically connected to the chipset 50. The pins/contacts 480 electrically contact respective ones of the contacts 490 when the door 410 is in the closed position, but do not electrically contact the respective ones of the contacts 490 when the door 410 is in the open position. As a result, the pins/contacts 480 electrically connect the cards 440, 460 (or other electronics devices connected to the interface 400) to the chipset 50 via the electronics interface 400 when the door 410 is in the closed position and the card 440 and/or card 460 engages the electronics interface 400. Conversely, the pins/contacts 480 do not electrically connect the card 440 and/or card 460 to the chipset 50 via the electronics interface 400 when the door 410 is in the open position and the card 440 and/or card 460 engage(s) the electronics interface 400.

As shown in FIGS. 12 and 13, the case 20 comprises a hole 500 through which the pins 480 move when the door 410 moves from its open position to its closed position. The hole 500 is preferably small (e.g., smaller in length or area than one or more of the interface 400, the card 440, and/or the card 460) so as to reduce an amount of electromagnetic and/or radio frequency interference that can enter the compartment 30 via the hole 500.

In the illustrated embodiment the electrical connection between the interface 400 and the motherboard 40 comprises pogo pins 480 on the door 410 and contact pads 490 on the motherboard 40. However, the relative positions of the pins and pads may be reversed without deviating from the scope of the present invention. In such an alternative embodiment, the pins may continuously extend from the motherboard 40 through the hole 500. Moreover, the pins 480 and pads 490 may alternatively be replaced by any other suitable connection that is formed by the closing of the door 410 without deviating from the scope of the present invention (e.g., male and female multi-pin connectors, a connector/interface similar or identical to the interface 770 and connector 760 used by the below discussed cartridge 700).

The use of contacts 480, 490 that electrically connect to each other when the door 410 closes may simplify construction of the tablet 10 according to one or more embodiments of the invention because the pads/contacts 490 can be formed on the motherboard 40 before the motherboard is mounted to the case 20. Similarly, the pins/contacts 480 can be mounted to the interface 400 before the interface 400 is mounted to the case 20. Once the motherboard 40 and interface 400 are mounted to the case 20, no further electrical connections or soldering need be made to facilitate connection between the motherboard 40 and the interface 400, despite them being on opposite sides of a small hole 500 in the case 20.

However, according to an alternative embodiment of the present invention, the interface 400 permanently electrically connects to the motherboard 40 via one or more cables that are soldered to or otherwise connected to the motherboard 40 and interface 400 during manufacture of the tablet 10. Such a cable or cables could extend through the hole, and the hole could be sealed around the cable to discourage debris from entering the sealed compartment 30.

As shown in FIGS. 3, 12, and 13, a tool-less locking mechanism 510 selectively locks the door 410 in the closed position. The locking mechanism 510 is manually movable by a user's hand between a locking position that locks the door 410 closed, and a released position that permits the door 410 to be opened and closed. In the illustrated embodiment, the locking mechanism 510 comprises a manually-operable, partial-turn, D-ring latch. However, any other suitable locking mechanism may alternatively be used without deviating from the scope of the present invention (e.g., tool-less or tool-requiring mechanism, captive bolt/screw, a latch or latches such as the latches 880, 890 discussed below, etc.).

As shown in FIGS. 12 and 13, a piston seal 530 surrounds the hole 500 and seals the hole 500 from the ambient environment/wet space 60 outside of the sealed compartment 30 or computer 10 when the door 410 is in the closed position. In the illustrated embodiment, the seal 530 is mounted to and moves with the door 410 relative to the case 20 such that the seal 530 is sandwiched between a side wall 540*a* of a recess 540 in the case 20 and the door 410 when the door 410 is closed. The piston seal 530 functions in a manner that is similar to or identical to the piston seal 790 of the below-discussed cartridge 700. The interface 400 and cards 440, 460 are therefore disposed within the sealed compartment 30 of the tablet 10 when the door 410 is closed.

The locking mechanism 510 may be designed to press the door 410 against the case 20 to compress the seal 530 and improve its sealing properties (e.g., improving its water-resistance and debris-resistance). For example, in the illustrated embodiment, an arm of the D-ring pin of the mechanism 510 may ride over a ramp/cam built into the case 20 as the pin is rotated toward its locked position so as to further press the door 410 against the case 20 and compress the seal 530.

Hereinafter, the battery 550 of the tablet 10 is described with reference to FIGS. 2, 3, and 4.

As shown in FIGS. 2 and 3, the battery 550 is movable between an attached position (shown in FIG. 2) and a detached position (shown in FIG. 3). In the attached position, the battery 550 is supported by the case 20 and electrically connects to the motherboard 40 (and other components such as the chipset 50 and display 80) via a power connector 560 (see FIGS. 3, 4) to provide power to the tablet 10. In the detached position, the battery 550 is not electrically connected to the tablet 10, and may or may not be physically connected to the tablet 10. A manually releasable locking mechanism 570 selectively retains the battery 550 in the attached position. The battery 550 may comprise one or more battery cells (e.g., a 4, 6, 8, 10 cell battery 550).

As shown in FIGS. 2 and 3, when the battery 550 is in its attached position, the battery 550 covers the door 410 and discourages or prevents the door 410 from being moved from its closed position to its open position. This, in turn, prevents the cards 440, 460 from being removed from the interface 400 unless the battery 550 is removed. This arrangement may reduce the chance of memory damage/loss to the memory card 460, which might otherwise occur if the card 460 were removed while still being powered by the battery 550.

Hereinafter, the GPS module 590 of the tablet 10 is described with reference to FIGS. 1 and 4.

As shown in FIGS. 1 and 4, the GPS module 590 module fixedly mounts to an exterior of the case 20 and electrically connects to the motherboard 40 and chipset 50 to provide GPS functionality to the tablet 10. The type of GPS module 590 used in combination with its positioning on the exterior of the case 20 provides sub-meter GPS accuracy (i.e., 100% of data is within 1.0 meters of accurate) according to one or more embodiments of the invention. Such accuracy may result from a combination of one or more of the following: the module's inclusion of a dedicated GPS antenna, the positioning of the module 590 on the top of the case 20 so as to provide an unobstructed view to the sky/GPS satellites, and/or the use of the latest generation GPS engine (e.g., from U-blox or others). According to one embodiment, the GPS module 590 comprises a GPS 2 Pro module.

Hereinafter, the tablet's use of antennas 630, 640 tuned to different geographical regions is described with reference to FIGS. 1, 4, 6, and 10.

The tablet 10 includes a radio such as the data packet radio 620 shown in FIG. 6 and/or the voice radio 380 shown in FIG. 10. As explained above, the radios 380, 620 connect to the motherboard 40 via suitable interfaces 210, 340. As shown in FIGS. 6 and 10, the radios 380, 620 include a main antenna connection 380*a*, 620*a* and an auxiliary antenna connection 380*b*, 620*b*. The main antenna connection 380*a*, 620*a* is used for transmitting signals and receiving signals. The auxiliary connection 380*b*, 620*b* is used for receiving signals and may be used for diversity.

As shown in FIG. 1, the tablet 10 includes two antennas 630, 640 mounted to the case 20. Different cellular/mobile radio frequencies are used in different geographical regions (e.g., U.S. and Europe). The U.S.-tuned antenna 630 is tuned to have a small loss (e.g., 3 dB or less in the transmit/receive) in the frequency range used in a first region (e.g., the U.S.), while having a larger loss (e.g., 5 dB loss) in the frequency range used in a second region (e.g., Europe). Conversely, the Europe-tuned antenna 640 is tuned to have a small loss (e.g., 3 dB or less in the transmit/receive) in the frequency range used in the second region, while having a larger loss (e.g., 5 dB loss) in the frequency range used in the first region.

As shown in FIGS. 4, 6, and 10, during manufacture of the tablet 10, the antenna 630, 640 that is tuned to the region for which the tablet 10 is intended to be used is hard-wired to the main antenna connection 380*a*, 620*a*, while the other antenna 630, 640 is hardwired to the auxiliary antenna connection 380*b*, 620*b*. Such hardwiring reduces signal loss relative to an alternative use of an intermediary switch that would switch relative connections of the antennas 630, 640 and connections 380a, 620a/380b, 620b. However, according to an alternative embodiment of the invention, such a switch may be used.

According to one or more embodiments, both antennas 630, 640 are included in each tablet 10 manufactured, regardless of whether the tablet 10 is intended for use/delivery into the first or second region. The inclusion of both antennas 630, 640 in each tablet 10 simplifies manufacture and may reduce the number of SKUs required to manufacture the tablet 10 for different regions, because the same hardware (i.e., both antennas 630, 640) are included in the tablet 10 regardless of destination region.

According to various embodiments, the use of two antennas 630, 640 may be less expensive and/or take of less space than the use of a dual-band or multi-band antenna that is suitable for use across multiple regions.

Thus, one or more embodiments of the present invention provide a method of manufacturing a plurality of computers, the method comprising: providing a computer with a radio and first and second antennas, the first antenna being tuned for use in a first geographical region, the second antenna being tuned for use in a second geographical region; determining which of the antennas is tuned for a geographical region of intended use of the computer; wiring the antenna that is tuned for the region of intended use to a main antenna connection of the radio; and wiring the antenna that is not tuned for the region of intended use to an auxiliary connection of the radio. The method may further comprise repeating these steps for additional computers with additional radios and antennas.

Hereinafter, the tablet's cartridge bay 800 and interchangeable cartridges 700, 1000 are described with reference to FIGS. 4 and 14-21.

As shown in FIGS. 14-20, the modular electronics cartridge 700 is movable relative to a cartridge bay 800 of the computer 10 between an engaged position (shown in FIGS. 2 and 3) and a disengaged position (shown in FIG. 5). When the cartridge 700 is in the disengaged position, the cartridge 700 is physically disconnected from the computer 10 (but may remain tethered or hinged to the computer 10 according to alternative embodiments of the invention).

As explained below, the cartridge 700 comprises a cartridge shell 720, electronics 730 disposed within the shell 720, an interface connector 760, a piston seal 790, and latches 880, 890.

Figure 20:
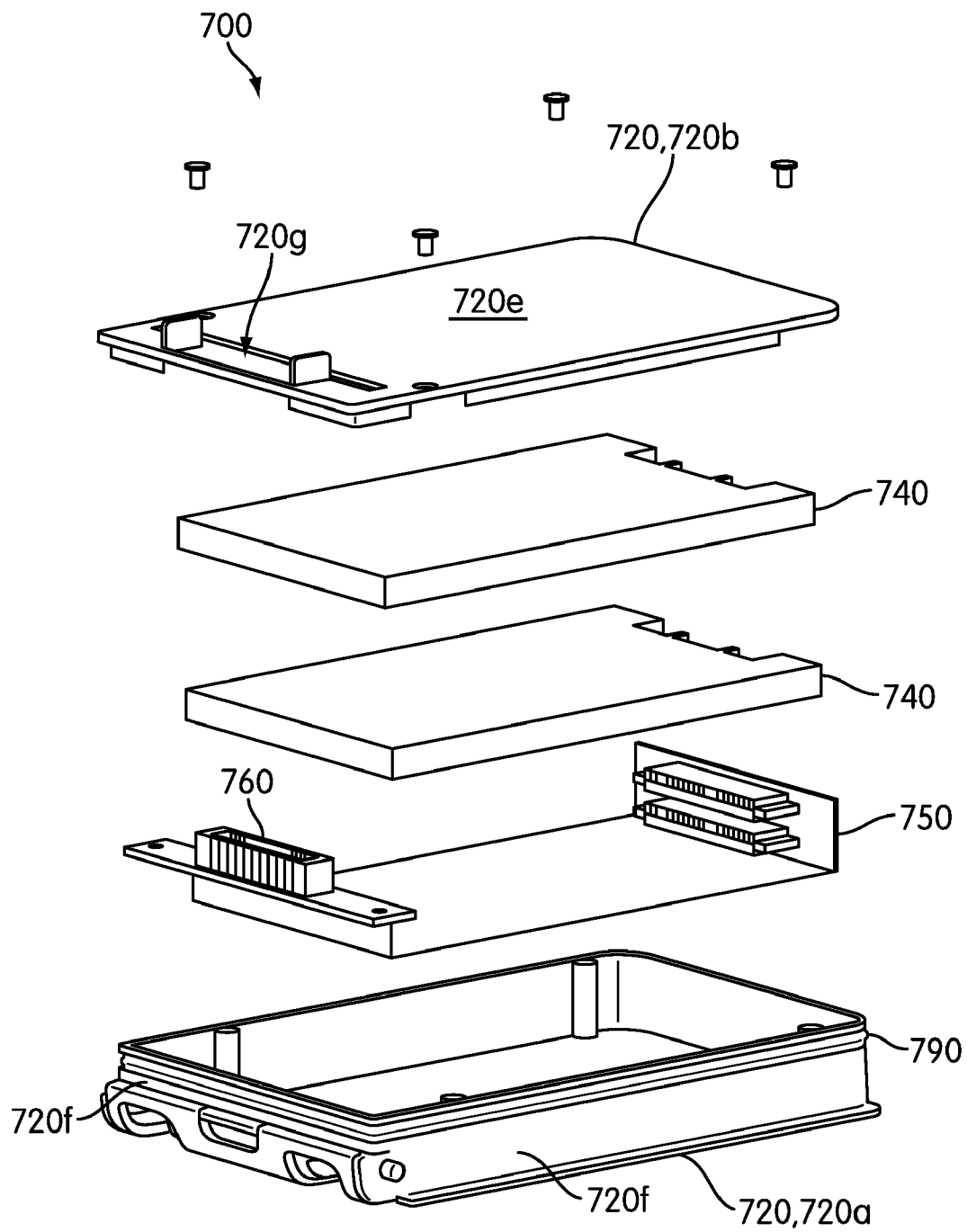
FIG. 20 is a perspective, exploded view of the cartridge of FIG. 14 containing a plurality of hard drives.

As shown in FIG. 20, the cartridge shell 720 comprises first and second shell portions 720a, 720b that bolt together to define a cartridge compartment 720c therein. The shell 720 may alternatively be defined by greater or fewer structures without deviating from the scope of the present invention. The shell 720 may comprise materials that are light, strong, impact resistant, abrasion-resistant, scratch-resistant, shock-absorbing, and/or water-tight (e.g., aluminum, titanium, magnesium, plastic, rubber, elastomeric materials, etc.).

Figure 21:
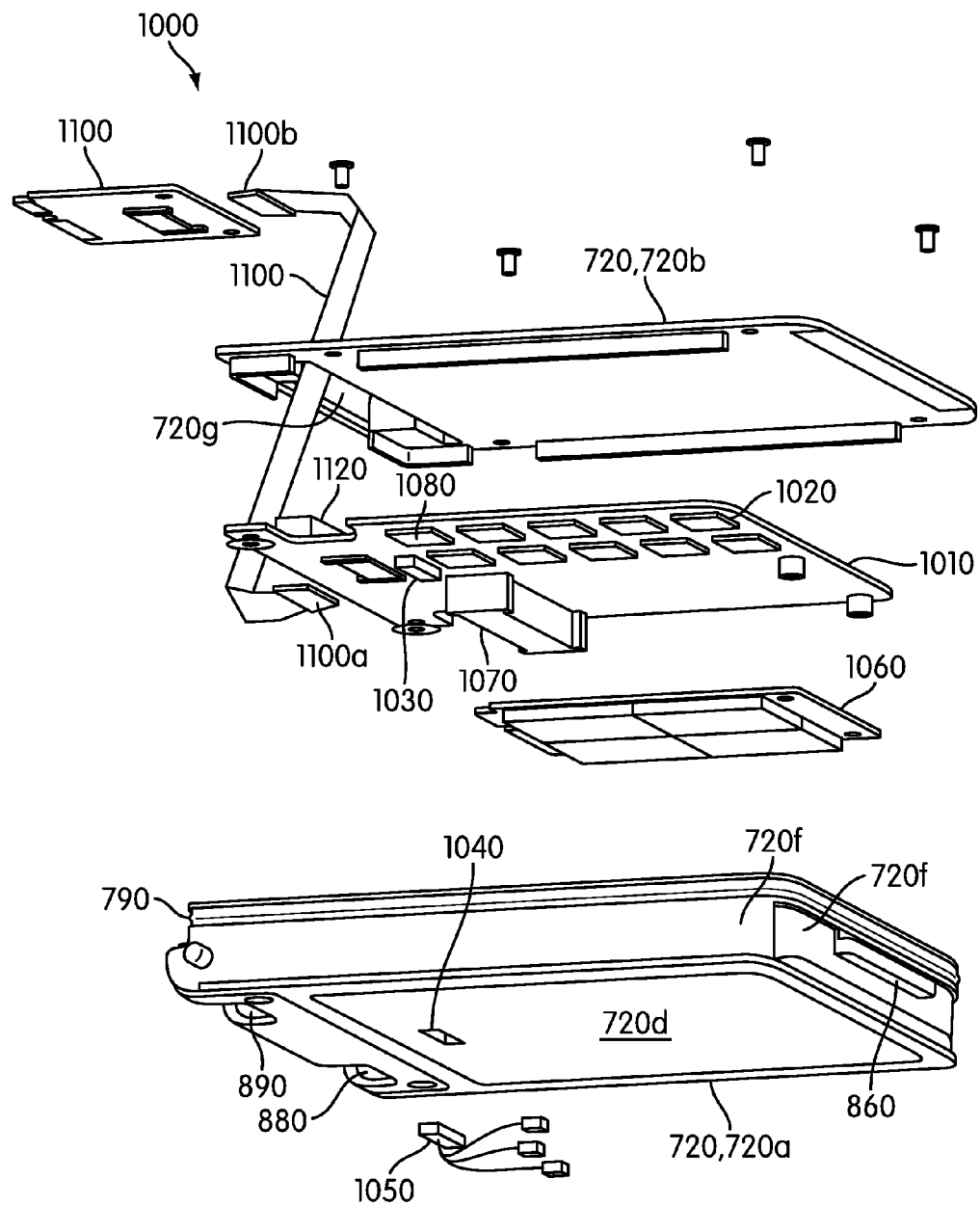
FIG. 21 is a perspective, exploded view of an alternative embodiment of an electronics cartridge for use with the computer of FIG. 1, wherein the cartridge includes a mass storage device and a video processor.

As shown in FIGS. 20 and 21, the cartridge shell 720 has a top 720d, a bottom 720e, and a side 720f extending in a loop between the top 702d and bottom 720e.

The cartridge electronics 730 are disposed in the cartridge compartment 720c. In the illustrated embodiment, the electronics 730 comprise one or more mass storage devices (e.g., two 1.8 inch SATA hard disk and/or solid state drives 740) connected to suitable connector 750 (or controller). However, the electronics 730 may alternatively comprise a variety of different types and combinations of electronics without deviating from the scope of the present invention. For example, the electronics may comprise just one drive 740. The electronics may alternatively comprise one or more mSATA drives or other mass storage devices connected to a suitable connector. As explained in greater detail below with respect to the cartridge 1000, the electronics 730 may alternatively comprise a combination of mass storage and processors or other electronics devices (e.g., radios, processors, etc.).

Multiple cartridges 700 may be provided with different electronics 730 so as to provide increased functionality to the tablet 10 by replacing a cartridge 700 in the bay 800 with a different cartridge 700.

As shown in FIG. 20, the interface connector 760 electrically connects to the electronics 730. In the illustrated embodiment, the connector 760 connects to the connector 750, which, in turn, connects to the hard drives 740. However, the connector 750 could alternatively connect directly to the hard drives 740 without deviating from the scope of the present invention. The connector 760 extends out of a hole 720g in the shell 720 or is otherwise accessible through the hole 720g.

Figure 14:
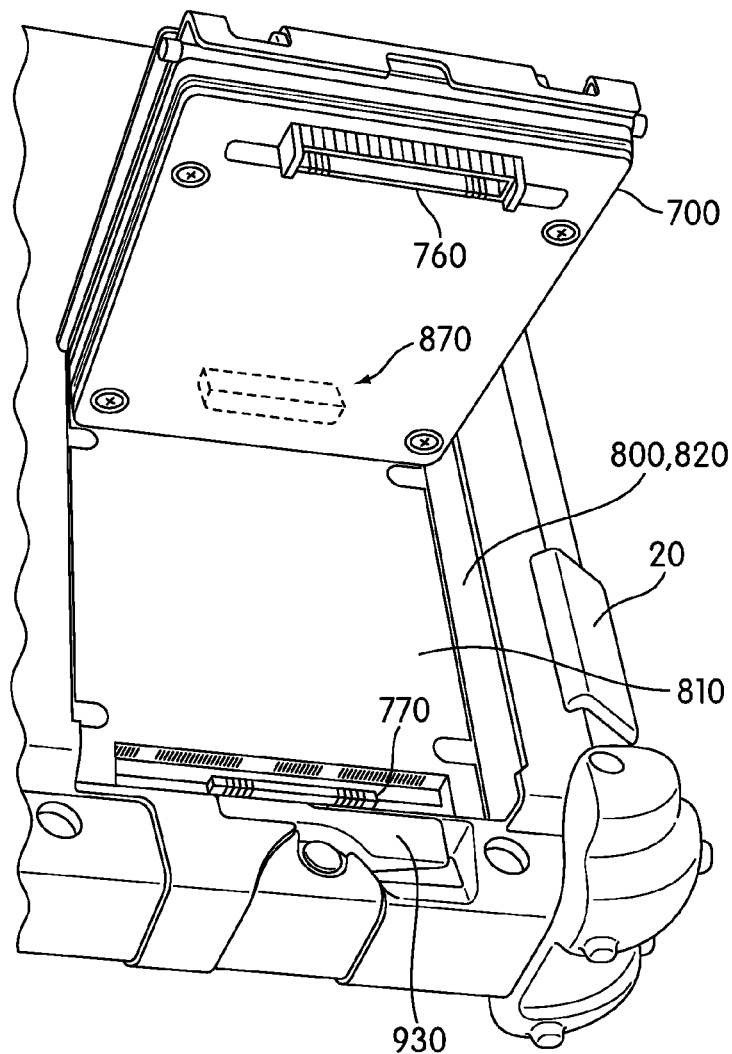
FIG. 14 is a rear perspective view of the computer of FIG. 1 showing an electronics cartridge in a partially disengaged position relative to an electronics cartridge bay of the computer.
Figure 17:
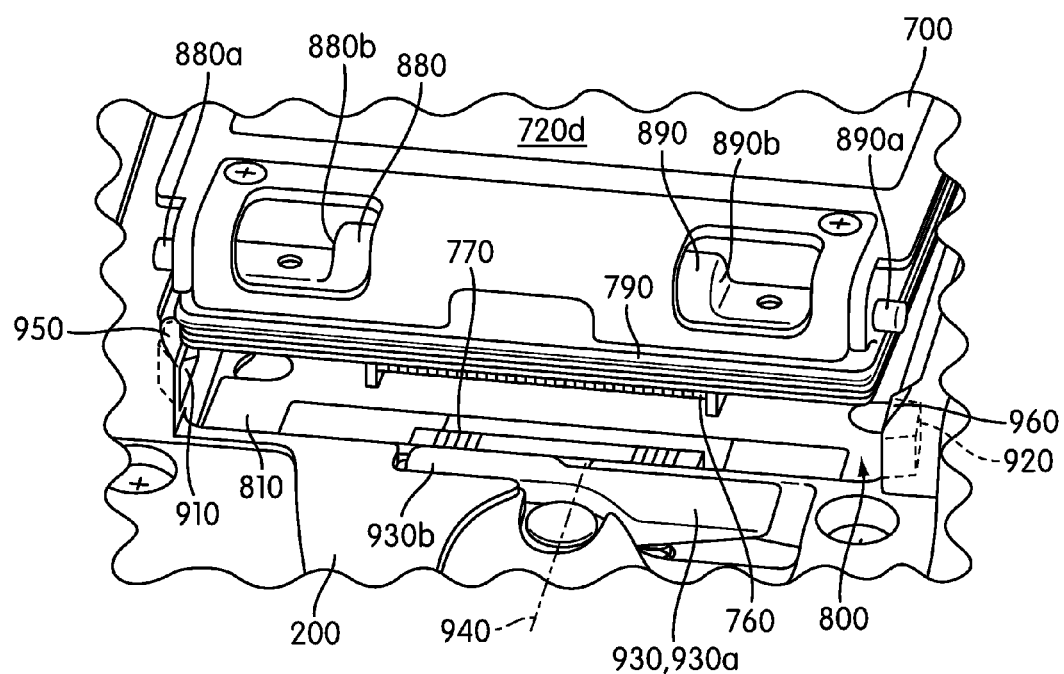
FIG. 17 is a partial perspective view of the computer of FIG. 1 showing the electronics cartridge in a partially removed position.

As shown in FIGS. 14 and 17, a corresponding electronics interface 770 is disposed in the cartridge bay 800 and electrically connects to the chipset 50 (see FIG. 4). In the illustrated embodiment, the interface connector 760 and interface 770 create a SATA connection from the electronics 730 to the chipset 50. The connection provides a data and power connection to the electronics 730. However, any other suitable connection or interface type may be used without deviating from the scope of the present invention. Engagement of the cartridge 700 with the bay 800 causes the connector 760 to electrically engage the interface connector 770 so as to electrically connect the electronics 730 to the computer 10 and chipset 50 thereof.

The piston seal 790 mounts to the cartridge shell 720 and surrounds the interface connector 760, specifically surrounding the hole 720g in the shell 720 through which the connector 760 is accessible. As shown in FIGS. 15-21, the piston seal 790 extends continuously around the side 720f of the bay 800 and forms a continuous perimeter.

Figure 18:
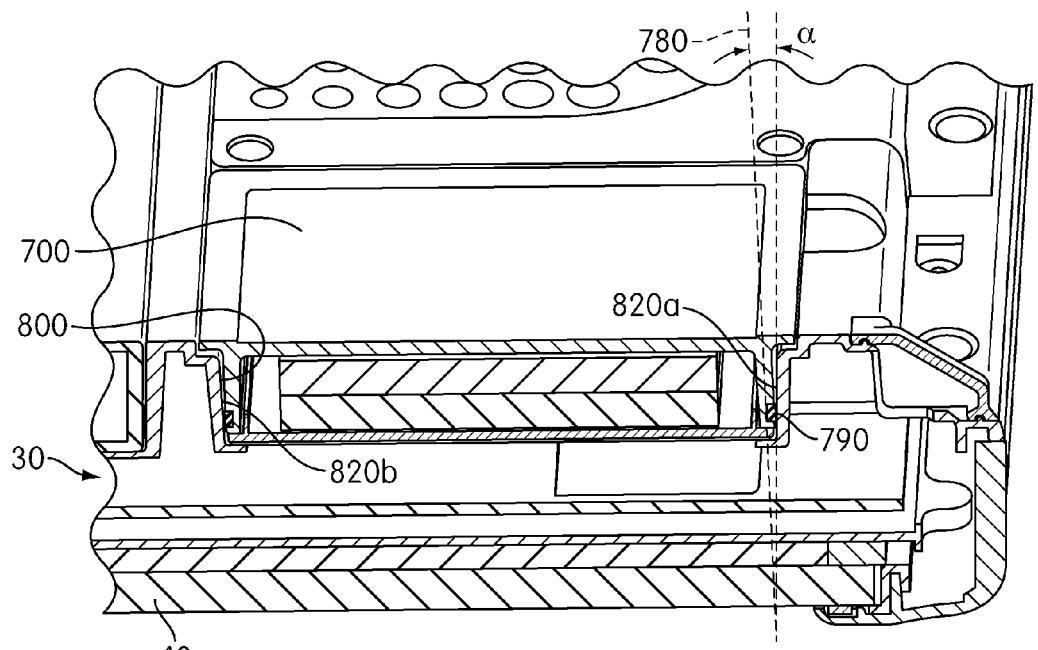
FIGS. 18 and 19 are partial, cross-sectional views of the computer of FIG. 1 showing the electronics cartridge in an engaged position.
Figure 19:
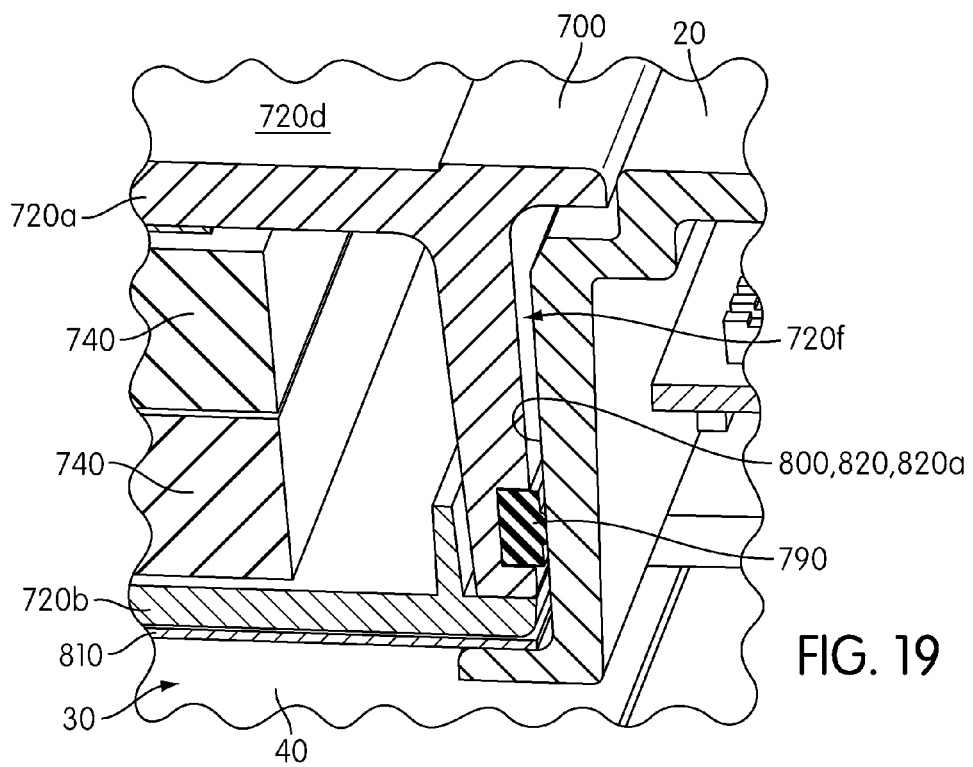

As shown in FIGS. 14, 17, and 19, the cartridge bay 800 is supported by and/or at least partially defined by the case 20 of the tablet 10. The bay 800 comprises a removable bay bottom 810 and a bay side wall 820 extending outwardly from the bottom 810. As best illustrated in FIGS. 18 and 19, at least a portion 820a of the bay side wall 820 slopes away from an opposing portion 820b (see FIG. 18) of the bay side wall 820 as the portion projects outwardly from the bottom 810. According to one or more embodiments, the sloped portion 820a extends around an entire perimeter of the side wall 820. As shown in FIG. 18, according to various embodiments, the sloped portion 820a forms an angle α of less than 45, 30, 20, 15, 10, and/or 5 degrees relative to a direction of movement 780 of a part of the piston seal 790 that contacts the sloped portion 820a as the cartridge 700 moves into its engaged position.

As a result of the sloping side wall 820a, when the cartridge 700 moves from the disengaged position to the engaged position, the piston seal 790 slides along the portion 820a of the side wall 820 and is disposed in an increasingly interference fit with the portion 820a and wall 820 generally, thereby creating a good seal between the perimeter of the cartridge 700 and the bay 800 when the cartridge is engaged in the bay 800. Thus, when the cartridge 700 is in the engaged position shown in FIGS. 3, 18, and 19, the cartridge 700 physically engages the cartridge bay 800 such that the piston seal 790 compressively engages the cartridge bay 800 and creates a water-tight seal that separates the interface connector 760 from an external environment (e.g., the wet space 60). A portion of the shell 720 on an opposite side of the seal 790 from the interface connector 760 is preferably water-tight so as to form a door that in combination with the water tight seal created by the seal 790 separates the sealed compartment 30 from the wet space 60.

The side wall 820 is preferably made of a strong, stiff material such as magnesium that is capable of enduring the force of the seal 790, whose sealing force is amplified by the cam/ramp operation of the sloped portion 820a.

As shown in FIG. 19, the seal 790 facilitates the use of the engaged cartridge 700 as a door to the sealed compartment 30. As best illustrated in FIGS. 5 and 9, by removing the cartridge 700 and the removable bay bottom 810 (if the bottom 810 is even used), a user can access components (e.g., the interfaces 210, 220 and electronics devices 300, 380, 620) within the sealed compartment 30 of the tablet 10 via a resulting access hole 830 in the case. As shown in FIG. 5, because the cartridge 700 is a relatively large area and the seal 790 spans a relatively large area, the access hole 830, too, can be relatively large (e.g., at least 2, 3, 4, 5, 6, 7, 8, 9, 10, 11, 12, 13, and/or 14 square inches). As shown in FIGS. 5 and 9, the access hole 830 provides external access (i.e. from outside of the tablet 10 and sealed compartment 30) to the interfaces 210, 220 and any devices 300, 380, 620 connected thereto to facilitate easy insertion, removal, and/or replacement of such devices 300, 380, 620, despite such devices being within the sealed compartment 30.

As shown in FIGS. 5, 14, 21, and 24, the cartridge bay 800 and the cartridge 700 include complimentary surface features 850 (see FIG. 5), 860 (see FIG. 21) that form a rough hinge 870 (see FIGS. 14 and 24) when engaged with each other. In the illustrated embodiment, the surface feature 850 of the cartridge bay 800 comprises a notch 850 in the sidewall 820 (see FIGS. 5, 24), and the surface feature 860 of the cartridge 700 comprises a complimentarily shaped flange 860 that protrudes from the side 720f (see FIGS. 21, 24) and fits into the notch 850. When the features 850, 860 are engaged with each other and used as a rough hinge 870 to pivot the cartridge 700 about a rough cartridge pivot axis 870a (see FIG. 24) into its engaged position, the hinge 870 prevents a portion of the cartridge 700 adjacent the hinge 870 from disengaging outwardly from the cartridge bay 800.

Figure 23:
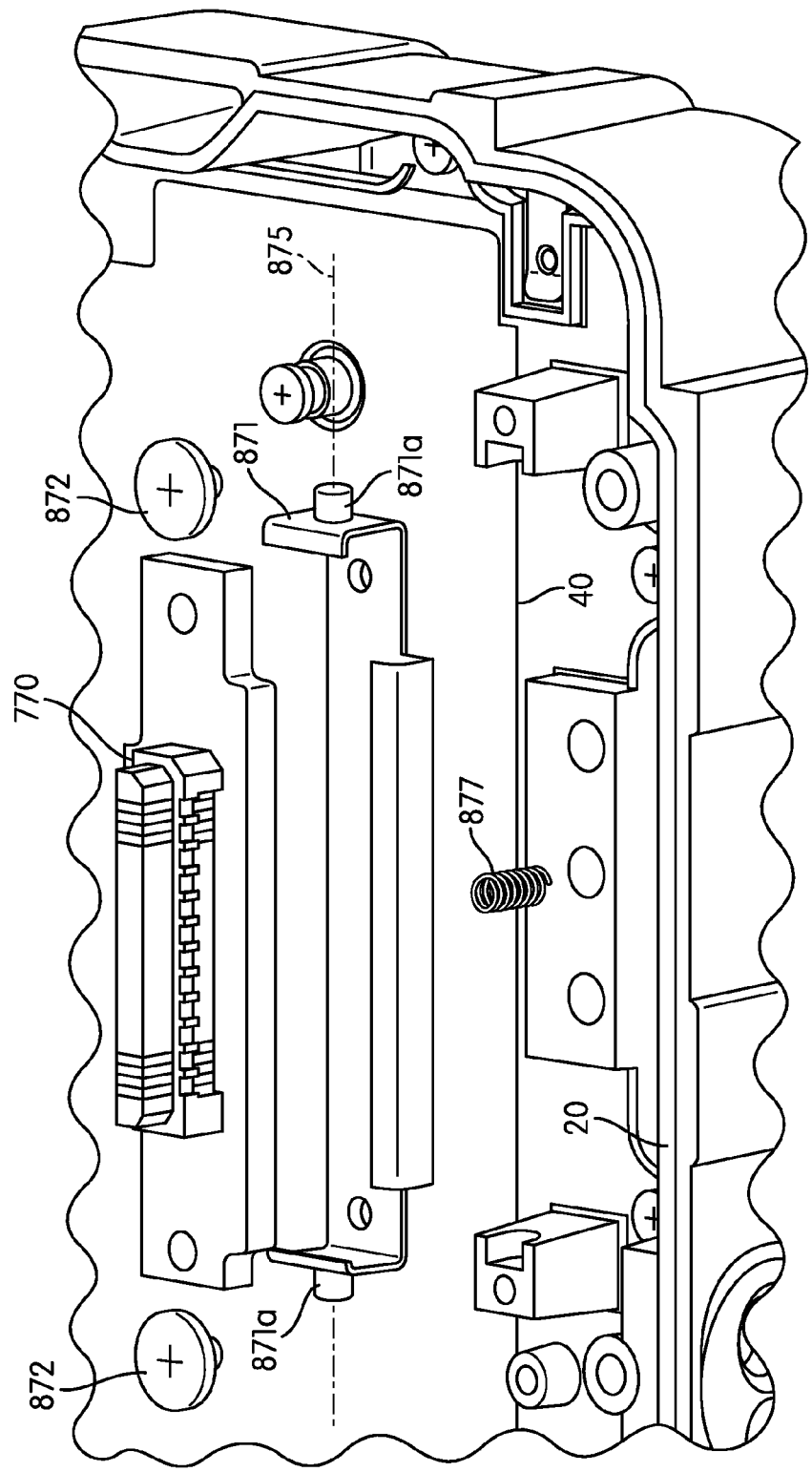
FIG. 23 is a partial, perspective, exploded view of a connection between an electronics interface of the cartridge bay and the case of the computer.
Figure 24:
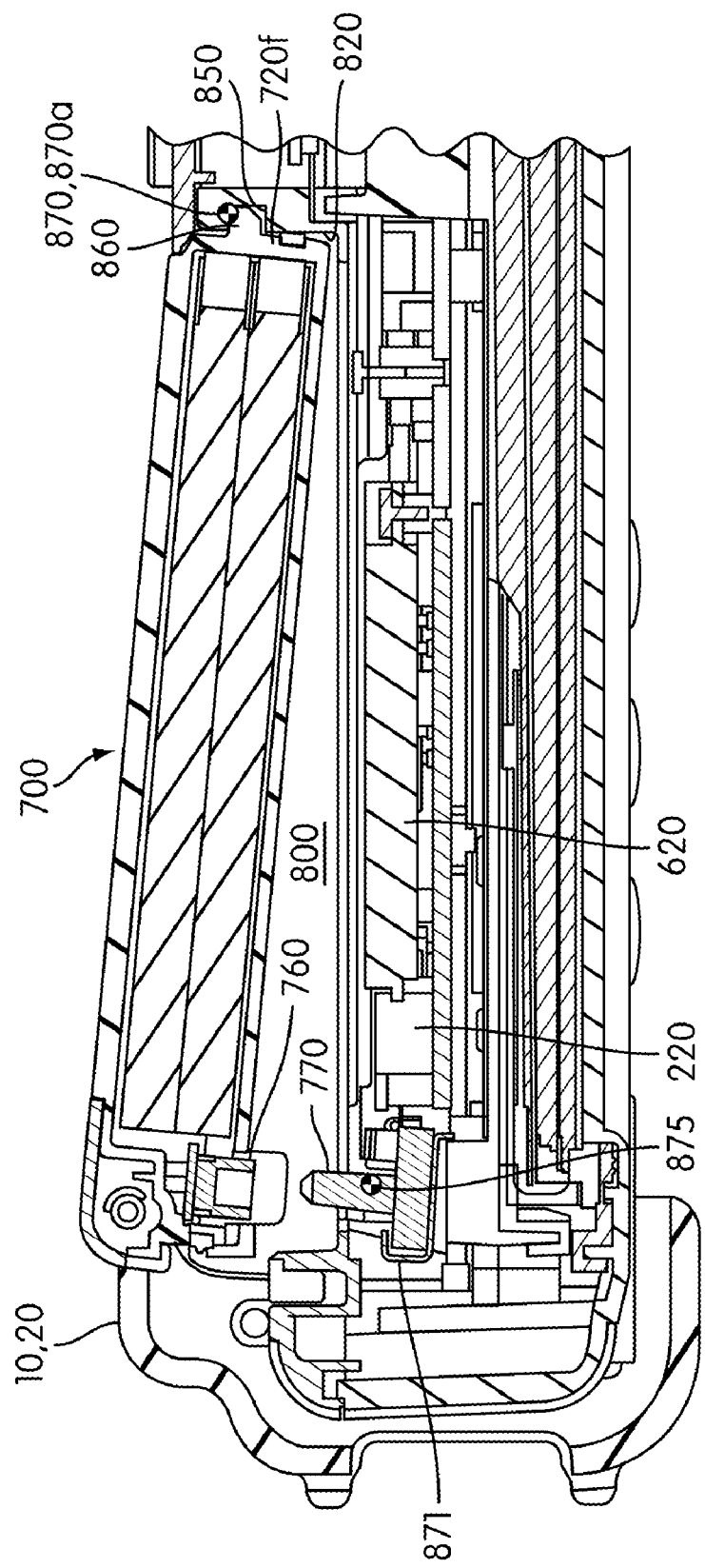
FIGS. 24 and 25 are partial cross-sectional views of the computer of FIG. 1, showing the electronics cartridge bay, an electronics interface thereof, and the electronics cartridge.
Figure 25:
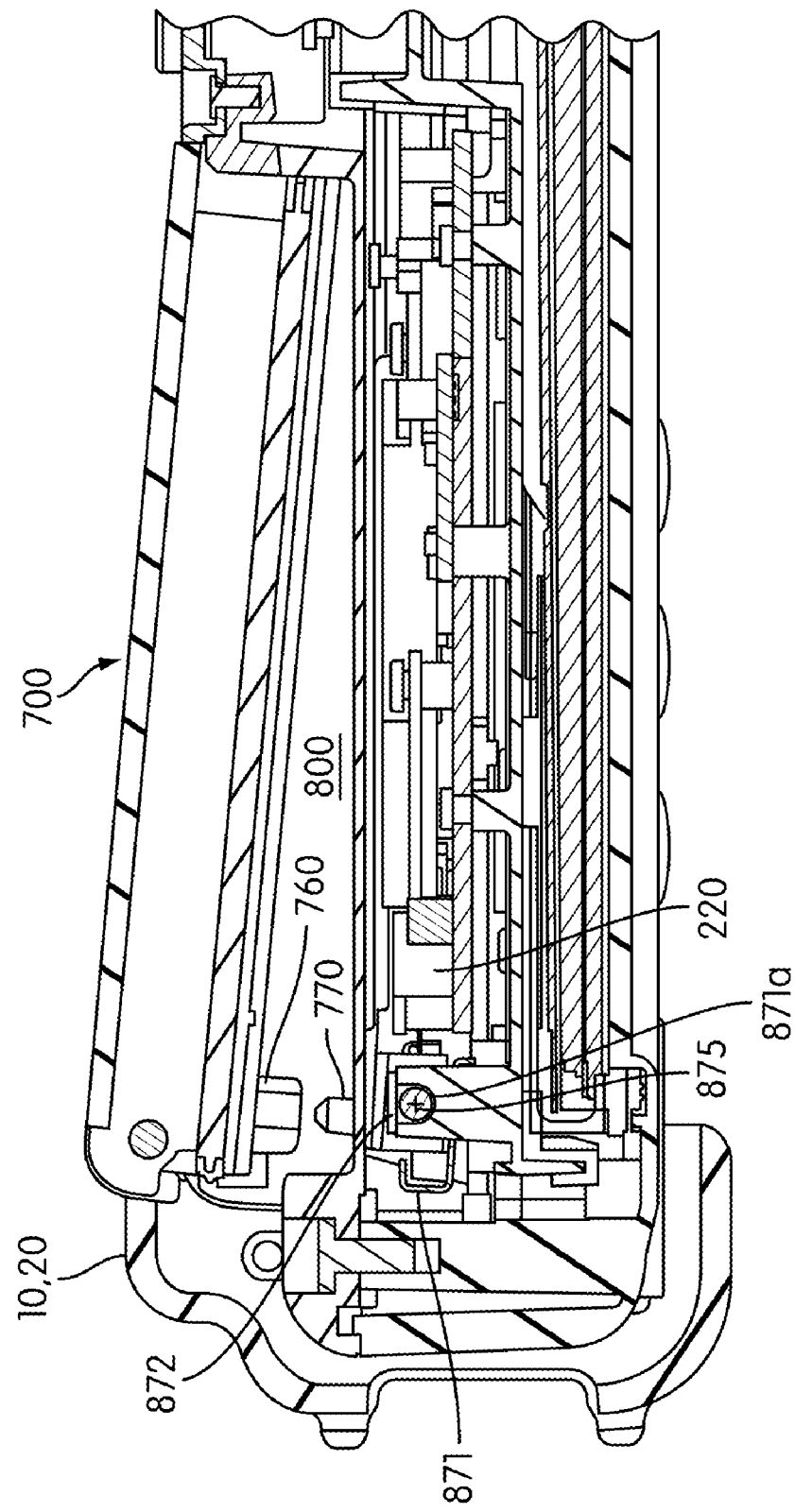

As shown in FIGS. 23-25, to accommodate the pivotal movement of the cartridge 700 as the cartridge 700 moves toward and into its engaged position, the interface 770 is likewise pivotally movable so as to match the pivotal orientation of the cartridge 700 as the cartridge 700 moves into its engaged position. The pivotal movement of the interface 770 enables the interface 770 to squarely connect to the connector 760, even as the connector 760 pivots into the engaged position of the cartridge 700.

As shown in FIGS. 23 and 25, the interface 770 mounts to a frame 871 that includes two pivot axles 871a that pivotally connect to the case 20 for pivotal movement, and are held in place by bolts 872 or other suitable fasteners. As a result, the interface 770 is pivotally movable relative to the case 20 about an interface axis 875 (see FIG. 25) between first and second positions. As shown in FIG. 24, the cartridge axis 870a is parallel to the interface axis 875.

The first position of the interface 770 (shown in FIGS. 24 and 25) is a position configured to initially connect the electronics interface 770 to the connector 760 of the cartridge 700 when the cartridge 700 is partially engaged with the bay 800 and the connector 760 first contacts the electronics interface 770. As shown in FIG. 24, the first position enables the interface 770 to squarely mate with the connector 760 in this initial partially skewed angular position of the cartridge 700 about the cartridge axis 870a.

The second position of the interface is a position in which the interface 770 extends straight upwardly, as shown in phantom dotted lines in FIG. 24. The second position is configured to electrically connect the interface 770 to the cartridge 700 and connector 760 thereof when the cartridge 700 is fully engaged with the cartridge bay 800 and the connector 760 extends straight downwardly toward the interface 770.

As shown in FIG. 23, a spring 877 operatively extends between the case 20 and the electronics interface 770 and urges the electronics interface 770 toward its first position. Movement of the cartridge 700 from the disengaged position to the engaged position causes the electronics interface 770 to move from its first position to its second position, against the bias of the spring 877.

Although the illustrated embodiment utilizes a pivotal connection between the interface 770 and the case 20, a variety of other types of connections could additionally or alternatively be used without deviating from the scope of the present invention (e.g., a multi-degree of freedom connection that permits the interface 770 to pivot and translate relative to the case 20).

Figure 15:
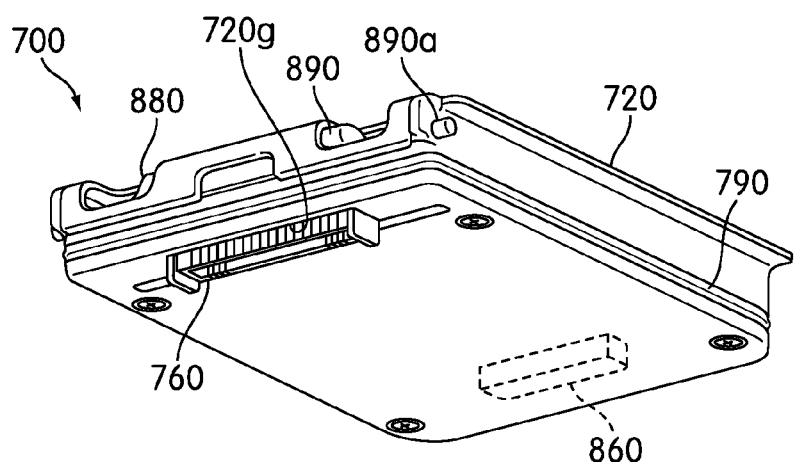
FIG. 15 is a lower perspective view of the electronics cartridge of FIG. 14.
Figure 16:
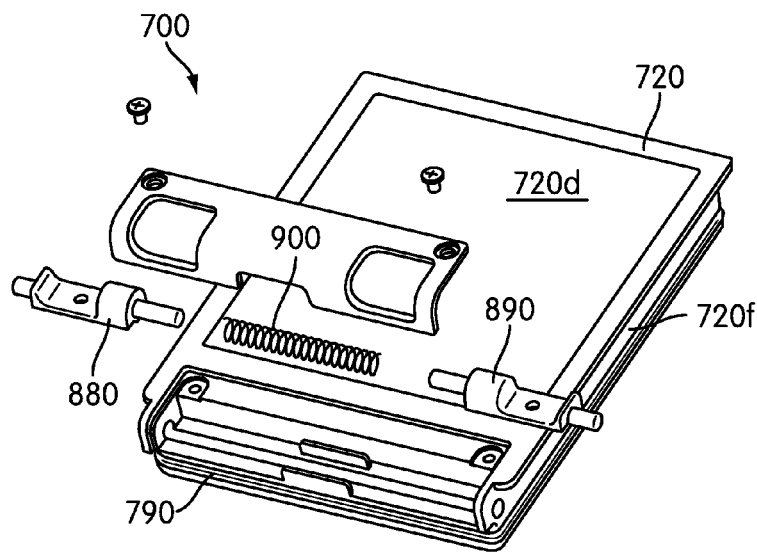
FIG. 16 is a partially-exploded, upper perspective view of the electronics cartridge of FIG. 14.

As shown in FIGS. 15-17, an end of the cartridge 700 opposite the flange 860 includes independently movable latches 880, 890 that are each movable relative to the shell 720 between a locking position (shown in FIGS. 14-15 and 17) and a releasing position. As shown in FIG. 17, when the latches 880, 890 are in their locking positions, pins 880a, 890a of the latches extend outwardly from the side 720f of the cartridge 700. As shown in FIG. 16, the latches 880, 890 are spring biased by a compression spring 900 toward their respective locking positions. When the cartridge 700 is in the engaged position and one of the latches 880, 890 is in its locked position, the pin 880a, 890a of the one of the latches 880, 890 engages a respective portion (e.g., a respective notch 910, 920 (see FIG. 17)) of the cartridge bay 800 and prevents the cartridge 700 from disengaging from the cartridge bay 800. Conversely, when the cartridge 700 is in the engaged position and the latches 880, 890 are in their releasing positions, the cartridge 700 is movable into its disengaged position.

As shown in FIG. 17, a spring-biased, manually actuatable ejector lever 930 can be manually depressed so that it pivots about a pivot axis 940 and pushes the cartridge 700 out of its engaged position when the latches 880, 890 are released to facilitate easier removal of the cartridge 700. Specifically, when a button 930a is manually pushed downwardly as shown in FIG. 17, a lever arm 930b moves upwardly. Because the lever arm 930b is disposed at least partially underneath a portion of the cartridge 700 when the cartridge 700 is in the engaged position, such upward movement of the lever arm 930b lifts the front of the cartridge 700 out of engagement with the bay 800, thereby facilitating disengagement of the cartridge 700.

As shown in FIG. 17, movement of the latches 880, 890 toward their releasing positions moves the latches 880, 890 toward each other, and movement of the latches 880, 890 toward their locking positions moves the latches 880, 890 away from each other. According to one or more embodiments of the invention, the opposing releasing directions of the latches 880, 890 assures that one latch 880, 890 is locked regardless of a shock direction endured by the tablet 10 during an impact. For example, if the tablet 10 is dropped and impacts on the right side of the tablet as shown in FIG. 17, the latch 880 may tend to move toward its released position against the bias of the spring 900, but the latch 890 remains locked, and is even urged by the impact to remain in the locked position, thereby keeping the cartridge 700 securely in its engaged position despite the impact.

As shown in FIG. 17, the cartridge bay 800 includes ramps 950, 960 disposed outwardly of the notches 910, 920 (upwardly as shown in FIG. 17). Movement of the cartridge 700 from its disengaged position toward its engaged position causes the latches 880, 890 to contact and slide against the ramps 93, 940, which force the latches 880, 890 into their releasing positions as the latches 880, 890 slide down the ramps 950, 960. Once the latches 880, 890 slide past the ramps 950, 960 and are disposed adjacent the notches 910, 920, the latches 880, 890 return to their locking position under the bias of the spring 900, and lock the cartridge 700 in its engaged position. According to various embodiments, inclusion of the ramps 950, 960 results in self-operating latches 880, 890 that need not be manually moved by the user to their released positions in order to engage the cartridge 700 with the bay 800.

In the illustrated embodiment, the ramps 950, 960 are disposed on the bay 800. However, the ramps could alternatively be formed on the pins 880a, 890a without deviating from the scope of the present invention. Such ramped pins could retract as they slide down a non-ramped portion of the bay 800 disposed outwardly from the notches 910, 920.

As shown in FIG. 17, the latches 880, 890 each comprise a finger grip 880b, 890b to facilitate one-handed operation of the latches 880, 890 such that a user may move the latches 880, 890 from their locking positions to their releasing positions by pinching the latches 880, 890 toward each other using only the fingers on one of the user's hands.

The combination of the piston seal 790, hinge 870, and latches 880, 890 provide a water-tight seal such that the cartridge 700 separates the sealed compartment 30 from the wet space 60 via a tool-less latch mechanism. In contrast, the use of a conventional compression head gasket instead of the piston seal 790 may have required the use of numerous, higher force fasteners (e.g., a tool-tightened series of screws/bolts) to achieve a water-tight seal over the large area of the cartridge 700. Moreover, conventional head gaskets typically require a larger perimeter seal area (e.g., 10 mm or more) than is required by the use of a piston seal 790 according to one or more embodiments of the invention, which may require as little as a 4.5 mm or less perimeter seal area. However, according to alternative embodiments of the present invention, such a conventional head gasket and tool-tightened fasteners could be used to attach the cartridge 700 without deviating from the scope of the present invention.

Hereinafter, the cartridge 1000 and its included video processor 1020 and mass storage device 1060 are described with reference to FIG. 21.

FIG. 21 illustrates a cartridge 1000 according to an alternative embodiment of the present invention. The cartridge 1000 includes the same shell 720, seal 790, flange 860, and latches 880, 890 as the cartridge 700, and physically connects to the tablet 10 in the same manner as the cartridge 700, but contains different cartridge electronics 730, a different or additional interface connector 1110, and a different type of electric connection to the tablet 10.

As shown in FIG. 21, the cartridge 1000 electronics 730 comprise a substrate 1010, a video processor 1020, a mass storage device 1060, and a controller 1080.

The substrate 1010 comprises a PCB, but may alternatively comprise any suitable substrate for connection to the video processor 1020, mass storage device 1060, and connectors 1110, 1120 without deviating from the scope of the present invention. According to one or more alternative embodiments, the substrate 1010 may be defined by the shell 720 itself, or omitted altogether without deviating from the scope of the present invention.

The video processor 1020 is supported by the substrate 1010, and provides video processing capability (e.g., video compression) to the tablet 10. The video processor 1020 may comprise any type of video processor. Moreover, according to various embodiments, the video processor 1020 may be replaced with any other type of electronics device without deviating from the scope of the present invention (e.g., an audio processor, a graphics processor, a radio, etc.).

The processor 1020 includes a video in/out port 1030 that is accessible through a hole 1040 in the shell 720. An octopus cable 1050 is removably connectable to the port 1030 and provides a plurality of video inputs/outputs (e.g., RCA, S-video, DVI, and/or HDMI in/out) for connection to external video equipment such as monitors and cameras.

The mass storage device 1060 may comprise any suitable type of storage device (e.g., hard drive, solid state drive, mini-SATA drive, NAND flash drive, etc.). The device 1060 connects to the substrate 1010 via a suitable interface 1070 (e.g., an mSATA connection).

The controller 1080 is supported by the substrate 1010. The controller 1080 electrically connects to the processor 1020 via electrical paths on the substrate or via a suitable connector. The controller 1080 electrically connects to the storage device 1060 via the interface 1070 or other suitable connector.

A flexible data cable 1100 extends through the hole 720g in the shell 720. One end 1100a of the cable 1100 connects to the controller 1080 via a suitable connector. The other end 1100b of the cable 1100 connects to an interface connector 1110 (e.g., a mini-PCI Express connector) that is adapted to engage the interface 210 or 220 (see FIG. 5). Use of the cable 1100 and connector 1110 provides a data connection between the cartridge 1000 and tablet 10 that is not available via the native interface 770 provided by the cartridge bay 800. For example, the mini-PCI Express interface 220 to which the connector 1110 connects provides different functionality than is available through the SATA interface 770 alone. For example, the connection of the connector 1110 to the mini PCI Express interface 220 facilitates connection of the video processor 1020 to the tablet 10, even though the video processor 1020 is positioned in a bay 800 that is designed for use by storage devices, rather than processors or other PCI-interface based electronics devices.

A connector 1120 extends from the substrate 1010 through the hole 720g and is electrically connected to the controller 1080. The connector 1120 may be identical to or similar to the connector 760 of the cartridge 700, and is adapted to engage the interface 770 of the cartridge bay 800.

To engage the cartridge 1000 with the tablet 10, the bay bottom 810 is removed so that the connector 1110 can be connected to the interface 210 or 220, as shown in FIG. 5. The bay bottom 810 may then be replaced with the cable 1100 routed through a hole or open slot in the bottom 810. Alternatively, the bottom 810 may remain removed. The cartridge 1000 is then physically engaged with the bay 800 in the same manner as discussed above with respect to the cartridge 700, which causes the connector 1120 to engage the interface 770.

The controller 1080 provides an interface between the processor 1020, storage device 1060, and the tablet 10 (e.g., the motherboard 40 and chipset 50) via the interface 210 or 220 and the connector 1110. The interface 210 or 220 may additionally provide the cartridge 1000 with power. The controller 1080 comprises a mini-PCIe to SATA bridge in order to connect the SATA storage device 1060 to the chipset 50 via the mini-PCIe interface 210 or 220. The controller 1080 also comprises a multiplexer to enable both the processor 1020 and storage device 1060 to share a single PCIe interface 210, 220.

According to various embodiments, the controller 1080, processor 1020, and/or storage device 1060 may alternatively draw power from the interface 770. In the illustrated embodiment, the cartridge 1000 does not use the interface 770 to provide a data connection with the tablet 10, motherboard 40, or chipset 50. However, according to alternative embodiments of the invention, a data connection between the storage device 1060 and tablet 10, motherboard 40, or chipset 50 may be provided through the connector 1120 and interface 770 in a manner similar to how the data connection to the drives 740 is provided in connection with the above-discussed cartridge 700.

Through use of the cartridge 1000, two electronics devices (the processor 1020 and storage device 1060) connect to the tablet 10 via a single interface 210 or 220, thereby eliminating the need for an additional interface and/or leaving an additional interface 210, 220 available for use by another electronics device (e.g., a radio 380, 620). The cartridge 1000 may provide greater functionality to the tablet 10 without increasing a form factor of the tablet 10 by providing two functions (processing via the processor 1020 and storage via the storage device 1060) in a space that would otherwise be used solely for storage (e.g., via the cartridge 700). In situations where storage capacity is in high demand, the cartridge 700 may be used with the tablet 10, as its multiple and larger storage devices 740 may provide for larger, faster storage. Conversely, in situations where video processing takes priority over storage, the cartridge 1000 may be used with the tablet 10. The ability to switch between different cartridges 700, 1000 containing different types and/or combinations of electronics 730 may provide modularity and improved functionality to the tablet 10 without increasing a form factor of the tablet 10.

According to an alternative embodiment of the present invention, the processor 1020 uses the interface 220 and connector 1110 for both power and data communication, while the storage device 1060 uses the interface 770 and connector 760 for both power and data communication. In such an embodiment, the controller 1080 may be eliminated altogether because the processor 1020 and storage device 1060 each utilize their own interface/connection to the chipset 50.

As shown in FIGS. 1 and 2, a power switch 1200 (see FIG. 2) and a plurality of function buttons 1210 (see FIG. 1) are supported by the case 20, electrically connected to the motherboard 40 and chipset 50 (see FIG. 4), and accessible from outside of the tablet 10.

Hereinafter, the ability to control the BIOS state of the operating system running on the tablet 10 before startup is described with reference to FIGS. 1 and 4.

There are situations where a user desires to turn on a computer without attracting attention (e.g., in field military use). Conventional computers typically start up in regular or "loud" BIOS mode (e.g., full brightness screen; volume/sound on; LEDs on), and can only be switched to a quiet BIOS mode (e.g., low brightness screen, low brightness LEDs, Mute) by accessing a BIOS control screen while the computer is in regular mode. To overcome this problem one or more embodiments of the invention enable the user to selectively turn the tablet 10 on in a quiet BIOS mode without first having to operate the computer in a loud mode. For example, the chipset 50, buttons 1200, 1210, and/or operating system stored on a storage device 740 of the tablet 10 are configured so that when the tablet 10 is OFF, a user can start the tablet 10 in quiet mode by simultaneously pressing the power switch 1200 and a combination of one or more of the buttons 1210, which causes the tablet 10 to start the operating system in a quiet BIOS mode without first entering a regular/"loud" BIOS mode or requiring the user to enter a BIOS control screen after the operating system is already running Other combinations of buttons 1210 and the switch 1200 could be used to start the operating system in alternative BIOS modes. The same or similar buttons 1210 may be configured such that their individual or simultaneous activation switches between BIOS modes on the fly while the operating system is running The "loud," "quiet," and additional BIOS states can be defined and altered by the user via a conventional BIOS program/screen that is accessed and used in the same manner as a conventional BIOS control screen. The traditional BIOS screen may also be used to switch between BIOS modes.

Thus, one or more embodiments of the invention provide a computer system and method for selecting a BIOS mode at startup without having to access a BIOS control screen such that the computer's operating system starts up in the selected BIOS mode without first operating under a different/default BIOS mode.

As shown in FIGS. 2 and 3, removal of the battery 550 provides access to an access panel 1300 (see FIG. 3) that is fastened to a remainder of the case 20 via suitable fasteners such as screws or bolts 1310. A piston seal 1320 is disposed between a sidewall of a recess in the case 20 and the panel 1300 around a perimeter of the panel 1300. The seal 1320 forms a water tight seal that separates the sealed compartment 30 from the wet space 60 when the panel 1300 is bolted in place. The piston seal 1320 operates in a manner that is similar or identical to the seal 530 of the door 410. Removal of the panel 1300 provides access to a hole 1330 in the case 20, through which additional electronics components such as RAM 1340 can be inserted and connected to the motherboard 40, and disconnected from the motherboard 40 and removed from the tablet 10. The panel 1300 and RAM 1340 can only be accessed when the battery 550 is removed.

The various storage devices 740, 1060 may comprise any type of suitable storage device without deviating from the scope of the present invention (e.g., hard disk drives, NAND flash drives, solid state drives, etc. that connect to the chipset 50 via any suitable standard (e.g., IDE, SATA, etc.)).

The seals 530, 790, 1320 and gasket 84 preferably comprise resilient materials (e.g., rubber, an elastomeric material, etc.) that are elastically deformable under pressure to form a water-tight seal with the surface (e.g., the case 20, walls 540*a*, 820*a*, touch panel 82) against which they are pressed.

As used herein, the term electrical connection and related phrases means the provision of an electrical path, and may result in a data connection (with may include an analog and/or digital signal connection) and/or power connection between two electrically connected components.

Although particular types of interfaces and connectors are disclosed herein, any connector and/or interface may be replaced with any other suitable connector or interface without deviating from the scope of the present invention. Moreover, an interface/connection may comprise a hardwired connection without deviating from the scope of the present invention.

While the illustrated tablet 10 is described and shown as including a variety of components, features, and structures, any one or more of these components, features, and structures may be omitted from the tablet 10 according to various embodiments, without deviating from the scope of the present invention. Conversely, a variety of additional features, components, and/or structures may be added to the tablet 10 without deviating from the scope of the present invention.

The foregoing illustrated embodiments are provided to illustrate the structural and functional principles of the present invention and are not intended to be limiting. To the contrary, the principles of the present invention are intended to encompass any and all changes, alterations and/or substitutions within the spirit and scope of the following claims.

What is claimed is:

1. A tablet computer comprising:
    a case defining a sealed compartment;
    a touch-screen display supported by the case, the display facing outward away from the case;
    the display further comprising a screen and a touch panel, disposed outwardly of the screen and being transparent to allow viewing of the screen therethrough, through an opening in the case;
    a sealing member, disposed between the touch panel and the opening in the case in a water tight sealing relation; and
    a frame, disposed about a perimeter of the touch panel and configured and arranged to transfer a compressive force generated between the sealing member and the touch panel to a chassis disposed in the case, substantially without transmitting the compressive force to the screen.

2. The computer of claim 1, wherein:
    the frame comprises a frame member having an L-shaped cross section, one leg of the frame member being structurally connected to a rear face of the touch panel, in supporting relation thereto, another leg of the frame member being structurally connected to the chassis.

3. The computer of claim 2, wherein:
    the frame member extends substantially around a perimeter of the touch panel.

4. The computer of claim 1, wherein the sealing member comprises an elastomeric material, and the compressive force is generated by at least one fastener configured and arranged to fasten the case to the chassis and to compress the sealing member between the touch panel and the case.

5. The computer of claim 1, wherein the chassis is mounted to the case.

6. The computer of claim 1, wherein the frame is constructed and arranged to produce a selected stackup distance between an upper surface of the chassis and an upper surface of the touch panel that contacts the sealing member.

7. The computer of claim 6, wherein the screen is partially compressible, and the frame is constructed and arranged to transfer the compressive force to the chassis without compressing the screen and without substantially altering the selected stackup distance.

8. The computer of claim 1, wherein the display comprises a screen with a viewable size that is at least 8 inches in the diagonal direction.

9. The computer of claim 1, wherein the display comprises a screen with a viewable area of at least 20 square inches.

10. The computer of claim 1, wherein a sealing force between the touch panel and the sealing member is substantially constant around a perimeter of the touch panel.

11. The computer of claim 1, wherein the display comprises first, second, and third user-selectable operating modes, the first operating mode comprising a touch only mode, the second operating mode comprising a stylus only mode, and the third operating mode comprising a dual mode with the stylus operation taking priority over touch operation.

12. The computer of claim 1, wherein the sealing member is adhered to the case and the touch panel.

13. The computer of claim 1, wherein the frame comprises a stamped, bent, stainless steel L-shaped member.

14. The computer of claim 1, wherein the screen is further supported by a shock absorbing material disposed between the chassis and a back surface of the screen.

15. A tablet computer comprising:
    a case defining a sealed compartment;
    a chipset disposed within the sealed compartment;
    a touch-screen display supported by the case and in electronic communication with the chipset, the display facing outward away from the case;
    the display further comprising a screen and a touch panel, disposed outwardly of the screen and being transparent to allow viewing of the screen therethrough, through an opening in the case, the touch panel being operationally connected to the chipset to accept user input for operation of the tablet computer;
    a sealing member, disposed between the touch panel and the opening in the case in a water tight sealing relation; and
    a frame, disposed about a perimeter of the touch panel and configured and arranged to transfer a compressive force generated between the sealing member and the touch panel to a chassis disposed in the case, substantially without transmitting the compressive force to the screen.

* * * * *

UNITED STATES PATENT AND TRADEMARK OFFICE
CERTIFICATE OF CORRECTION

PATENT NO. : 8,373,980 B2
APPLICATION NO. : 13/039054
DATED : February 12, 2013
INVENTOR(S) : David Reber It is certified that error appears in the above-identified patent and that said Letters Patent is hereby corrected as shown below:

On title page, item (73) Assignee, Line 1
replace "Explore Technologies Corp.,"
with --Xplore Technologies Corp.,"--.

Signed and Sealed this
Fourth Day of June, 2013

Teresa Stanek Rea
*Acting Director of the United States Patent and Trademark Office*